(12) United States Patent
Wang et al.

(10) Patent No.: US 11,688,111 B2
(45) Date of Patent: Jun. 27, 2023

(54) VISUALIZATION OF A MODEL SELECTION PROCESS IN AN AUTOMATED MODEL SELECTION SYSTEM

(71) Applicant: International Business Machines Corporation, Armonk, NY (US)

(72) Inventors: Dakuo Wang, Cambridge, MA (US); Bei Chen, Blanchardstown (IE); Ji Hui Yang, Beijing (CN); Abel Valente, Buenos Aires (AR); Arunima Chaudhary, Boston, MA (US); Chuang Gan, Cambridge, MA (US); John Dillon Eversman, Austin, TX (US); Voranouth Supadulya, Round Rock, TX (US); Daniel Karl I. Weidele, Cambridge, MA (US); Jun Wang, Xi'an (CN); Jing James Xu, Xi'an (CN); Dhavalkumar C. Patel, White Plains, NY (US); Long Vu, Chappaqua, NY (US); Syed Yousaf Shah, Yorktown Heights, NY (US); Si Er Han, Xi'an (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/942,284

(22) Filed: Jul. 29, 2020

(65) Prior Publication Data
US 2022/0036610 A1 Feb. 3, 2022

(51) Int. Cl.
*G06T 11/20* (2006.01)
*G06F 3/0481* (2022.01)
(Continued)

(52) U.S. Cl.
CPC .......... *G06T 11/206* (2013.01); *G06F 3/0481* (2013.01); *G06N 5/00* (2013.01); *G06N 20/00* (2019.01)

(58) Field of Classification Search
CPC ........ G06T 11/206; G06F 3/08; G06F 3/0481; G06N 20/00; G06N 5/00
See application file for complete search history.

(56) References Cited

U.S. PATENT DOCUMENTS 6,745,150 B1 6/2004 Breiman
8,275,540 B2 9/2012 Downs et al.
(Continued)

FOREIGN PATENT DOCUMENTS

NO 02/39254 5/2002
WO WO-2020239033 A1 * 12/2020 ........... G06F 3/0484

OTHER PUBLICATIONS

Aecio Santos, "Visus: an Interactive System for Automatic Machine Learning Model Building and Curation", Jul. 5, 2019, ACM, All pages (Year: 2019).*

(Continued)

*Primary Examiner* — Roberto Borja
(74) *Attorney, Agent, or Firm* — Amin, Turocy & Watson, LLP

(57) ABSTRACT

Systems, computer-implemented methods, and computer program products to facilitate visualization of a model selection process are provided. According to an embodiment, a system can comprise a memory that stores computer executable components and a processor that executes the computer executable components stored in the memory. The computer executable components can comprise an interaction backend handler component that obtains one or more assessment metrics of a model pipeline candidate. The computer executable components can further comprise a visualization render component that renders a progress visu- (Continued)

alization of the model pipeline candidate based on the one or more assessment metrics.

19 Claims, 11 Drawing Sheets

(51) Int. Cl.
    *G06N 20/00*     (2019.01)
    *G06N 5/00*     (2023.01)

(56) References Cited

U.S. PATENT DOCUMENTS

| | | | |
|---|---|---|---|
| 8,972,443 | B2 | 3/2015 | LaRowe et al. |
| 9,195,361 | B1 * | 11/2015 | Gil de Paiva .......... H04L 65/601 |
| 9,727,447 | B1 * | 8/2017 | Elgarat ............... G06F 11/3672 |
| 10,387,900 | B2 | 8/2019 | Bledsoe et al. |
| 10,560,313 | B2 | 2/2020 | Sglavo et al. |
| 10,650,928 | B1 | 5/2020 | Larson et al. |
| 10,719,301 | B1 * | 7/2020 | Dasgupta ................... G06F 8/33 |
| 2007/0299798 | A1 | 12/2007 | Suyama et al. |
| 2016/0232457 | A1 * | 8/2016 | Gray ....................... G06T 11/206 |
| 2017/0061329 | A1 * | 3/2017 | Kobayashi .............. G06N 20/00 |
| 2017/0116530 | A1 | 4/2017 | Modarresi |
| 2018/0046926 | A1 | 2/2018 | Achin et al. |
| 2018/0308231 | A1 | 10/2018 | Kish et al. |
| 2019/0018821 | A1 | 1/2019 | Ormont et al. |
| 2019/0205838 | A1 | 7/2019 | Fang et al. |
| 2019/0228261 | A1 | 7/2019 | Chan |
| 2019/0362222 | A1 * | 11/2019 | Chen ....................... G06N 20/00 |
| 2019/0370684 | A1 * | 12/2019 | Gunes ..................... G06N 20/00 |
| 2019/0377984 | A1 | 12/2019 | Ghanta et al. |
| 2019/0384640 | A1 | 12/2019 | Swamy et al. |
| 2019/0392252 | A1 | 12/2019 | Fighel et al. |
| 2019/0392547 | A1 | 12/2019 | Katouzian et al. |
| 2019/0394083 | A1 | 12/2019 | Sglavo et al. |
| 2020/0027210 | A1 | 1/2020 | Haemel et al. |
| 2020/0097810 | A1 | 3/2020 | Hetherington et al. |
| 2020/0097867 | A1 * | 3/2020 | Scriven ............ G06Q 10/06313 |
| 2020/0111022 | A1 | 4/2020 | Silberman et al. |
| 2020/0184327 | A1 * | 6/2020 | Dey ........................ G06N 3/086 |
| 2021/0326736 | A1 | 10/2021 | Kishimoto et al. |
| 2021/0390458 | A1 | 12/2021 | Blumstein et al. |

OTHER PUBLICATIONS

He et al., "AMC: AutoML for Model Compression and Acceleration on Mobile Devices," Proceedings of the European Conference on Computer Vision (ECCV), arXiv:1802.03494v4 [cs.CV], 2018, 17 pages.
Billman et al., "Automated Discovery in Managerial Problem Formulation: Formation of Causal Hypotheses for Cognitive Mapping," Decision Sciences, vol. 24, Issue 1, 1993, 19 pages.
Wang et al., "Human-AI Collaboration in Data Science: Exploring Data Scientists' Perceptions of Automated AI," Proceedings of the ACM on Human-Computer Interaction, vol. 3, Article 211, arXiv:1909.02309v1 [cs.HC], Nov. 2019, 24 pages.
Drozdal et al., "Trust in AutoML: Exploring Information Needs for Establishing Trust in Automated Machine Learning Systems," Proceedings of the 25th International Conference on Intelligent User Interfaces Companion, arXiv:2001.06509v1 [cs.LG], Mar. 17-20, 2020, 11 pages.
Weidele et al., "AutoAIViz: Opening the Blackbox of Automated Artificial Intelligence with Conditional Parallel Coordinates," Proceedings of the 25th International Conference on Intelligent User Interfaces Companion, arXiv:1912.06723v3 [cs.LG], Mar. 17-20, 2020, 5 pages.
Wang et al., "AutoAI: Automating the End-to-End AI Lifecycle with Humans-in-the-Loop," Proceedings of the 25th International Conference on Intelligent User Interfaces Companion, Mar. 17-20, 2020, pp. 77-78, 2 pages.
"Microsoft Azure," https://azure.microsoft.com/en-us/, Last acessed on Jul. 8, 2020, 12 pages.
"Google Cloud AutoML," https://cloud.google.com/automl, Last acessed on Jul. 8, 2020, 9 pages.
"Amazon SageMaker," https://aws.amazon.com/sagemaker/, Last acessed on Jul. 8, 2020, 14 pages.
"H2O AutoML," https://www.h2o.ai/products/h2o-automl/, Last acessed on Jul. 8, 2020, 5 pages.
"DataRobot," https://www.datarobot.com/, Last acessed on Jul. 8, 2020, 5 pages.
Mell et al., "The NIST Definition of Cloud Computing," Recommendations of the National Institute of Standards and Technology, NIST Special Publication 800-145, Sep. 2011, 7 pages.
Laadon, et al. "RankML:MetaLearning-BasedApproachfor Pre-RankingMachineLearningPipelines" arXiv:1911.00108v2 [cs.LG] Nov. 20, 2019. 8 pages.
Feurer, et al. "Chapter 6 Auto-sklearn: Efficient and Robust Automated Machine Learning" F. Hutter et al. (eds.), Automated Machine Learning, The Springer Series on Challenges in Machine Learning, 2019. 22 pages.
Sabharwal, et al. "Selecting Near-Optimal Learners via Incremental Data Allocation" Proceedings of the Thirtieth AAAI Conference on Artificial Intelligence (AAAI-16). 9 pages.
"What is automated machine learning (AutoML)?" Microsoft, https://docs.microsoft.com/en-us/azure/machine-learning/concept-automated-ml, Last Accessed Jul. 8, 2020, 15 pages.
Komer et al., "Hyperopt-Sklearn: Automatic Hyperparameter Configuration for Scikit-Learn" Proc. of the 13th Python in Science Conf. (SCIPY 2014). 6 pages.
Raza et al. "AutomatedDataExtractionusingPredictiveProgramSynthesis" Association for the Advancement of Artificial Intelligence 2017. 9 pages.
Lee et al. "Accelerating Search-Based Program Synthesis using Learned Probabilistic Models" Association for Computer Machinery 2018. 17 pages.
Khurana et al. "Cognito: Automated Feature Engineering for Supervised Learning" 2016 IEEE 16th International Conference on Data Mining Workshops (ICDMW). 4 pages.
Khurana et al. "Feature Engineering for Predictive Modeling using Reinforcement Learning" arXiv:1709.07150v1 [cs.AI] Sep. 21, 2017. 8 pages.
Lam et al. "Feature Learning From Relational Databases" arXiv:1801.05372v4 [cs.AI] Jun. 15, 2019. 15 pages.
Nargesian et al. "Learning Feature Engineering for Classification" Proceedings of the Twenty-Sixth International Joint Conference on Artificial Intelligence (IJCAI-17). 8 pages.
Ellis et al. "Exploring Big Data with Helix: Finding Needles in a Big Haystack" SIGMOD Record, Dec. 2014 (vol. 43, No. 4). 12 pages.
Hassanzadeh et al. "Understanding a Large Corpus of Web Tables Through Matching with Knowledge Bases—an Empirical Study" OM 2015:25-34. 10 pages.
Yeganeh et al. "Linking Semistructured Data on the Web" Fourteenth International Workshop on the Web and Databases (WebDB2011),Jun. 12, 2011—Athens,Greece. 6 pages.
Lehmberg et al. "Ontology Augmentation Through Matching with Web Tables" http://disi.unitn.it/~pavel/om2018/papers/om2018_LTpaper4.pdf. 2018. 12 pages.
Fokoue et al. "Predicting Drug-Drug Interactions Through Similarity-Based Link Prediction Over Web Data" WWW'16 Companion, Apr. 11-15, 2016, Montreal, Quebec, Canada. ACM 978-1-4503-4144-8/16/04. 4 pages.
Glass et al. "Inducing Implicit Relations from Text Using Distantly Supervised Deep Nets" The Semantic Web—ISWC 2018 vol. 11136 (17th International Semantic Web Conference, Monterey, CA, USA, Oct. 8-12, 2018, Proceedings, Part I) 18 pages.
"Natural Language Interaction With Automated Machine Learning Systems" U.S. Appl. No. 16/551,021, filed Aug. 26, 2019, 23 pages.
Personalized Automated Machine Learning U.S. Appl. No. 16/805,019, filed Feb. 28, 2020, 21 pages.
"Code Generation for Auto-AI" U.S. Appl. No. 16/919,258, filed Jul. 2, 2020, 35 pages.
"Automated Artificial Intelligence Radial Visualization" U.S. Appl. No. 16/557,760, filed Aug. 30, 2019, 61 pages.

(56) References Cited

OTHER PUBLICATIONS

Weidele et al., "Conditional Parallel Coordinates in Automated Artificial Intelligence With Constraints" U.S. Appl. No. 16/832,528, filed Mar. 27, 2020, 61 pages.
Wang et al., "Transfer Learning Across Automated Machine Learning Systems" U.S. Appl. No. 16/806,626, filed Mar. 2, 2020, 50 pages.
Non-Final Office Action received for U.S. Appl. No. 16/942,247 dated Aug. 18, 2022, 58 pages.
Notice of Allowance received for U.S. Appl. No. 16/942,247 dated Nov. 29, 2022, 35 pages.
Corrected Notice of Allowability received for U.S. Appl. No. 16/942,247 dated Dec. 8, 2022, 11 pages.

\* cited by examiner

VISUALIZATION OF A MODEL SELECTION PROCESS IN AN AUTOMATED MODEL SELECTION SYSTEM

BACKGROUND

The subject disclosure relates to automated model selection systems, and more specifically, to visualization of a model selection process in an automated model selection system.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate visualization of a model selection process are described.

According to an embodiment, a system can comprise a memory that stores computer executable components and a processor that executes the computer executable components stored in the memory. The computer executable components can comprise an interaction backend handler component that obtains one or more assessment metrics of a model pipeline candidate. The computer executable components can further comprise a visualization render component that renders a progress visualization of the model pipeline candidate based on the one or more assessment metrics.

According to another embodiment, a computer-implemented method can comprise obtaining, by a system operatively coupled to a processor, one or more assessment metrics of a model pipeline candidate. The computer-implemented method can further comprise rendering, by the system, a progress visualization of the model pipeline candidate based on the one or more assessment metrics.

According to another embodiment, a computer program product facilitating a visualized model selection process is provided. The computer program product comprising a computer readable storage medium having program instructions embodied therewith, the program instructions executable by a processor to cause the processor to obtain, by the processor, one or more assessment metrics of a model pipeline candidate. The program instructions are further executable by the processor to cause the processor to render, by the processor, a progress visualization of the model pipeline candidate based on the one or more assessment metrics.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Automated artificial intelligence and/or automated machine learning (AutoAI/AutoML) is the use of programs and algorithms to automate the end to end human intensive and otherwise highly skilled tasks involved in building and operationalizing artificial intelligence (AI) and/or machine learning models.

The initiative for most automated machine learning predictive systems is to mimic the expertise and workflow of data scientists. The expertise of a human data scientist is most valuable from two aspects: 1) insights about the choice of models (e.g., a data scientist typically considers a several models selected by prior knowledge); and 2) insights about feature generation and/or feature engineering. The combination of the two lead to achieving high accuracy in a timely manner Most automated machine learning systems use brute force (e.g., human effort and/or relatively high computational costs) to search for predictive models from scratch and rely on a pre-defined general framework to generate a large number of features.

Figure 1:
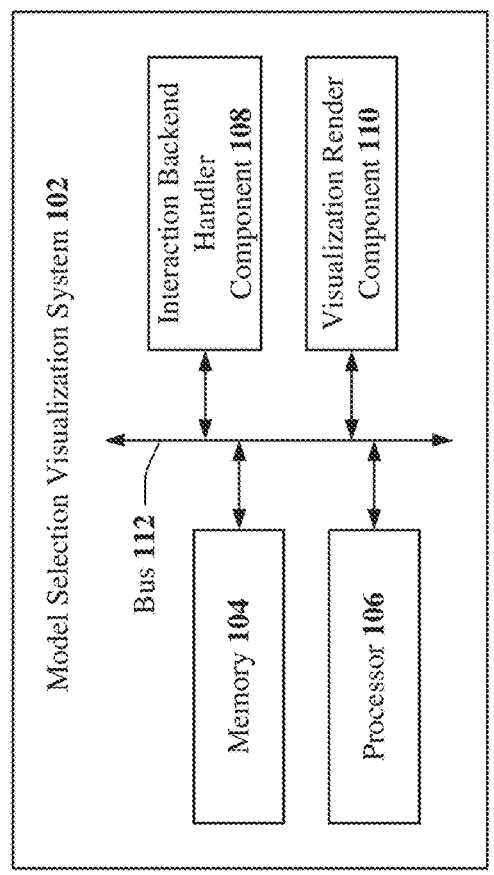
FIGS. 1 and 2 illustrate block diagrams of example, non-limiting systems that can facilitate visualization of a model selection process in accordance with one or more embodiments described herein.

FIG. 1 illustrates a block diagram of an example, non-limiting system 100 that can facilitate visualization of a model selection process in accordance with one or more embodiments described herein. System 100 can comprise a model selection visualization system 102, which can be associated with a cloud computing environment. For example, model selection visualization system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

Model selection visualization system 102 and/or components thereof (e.g., interaction backend handler component 108, visualization render component 110, action component 202, etc.) can employ one or more computing resources of cloud computing environment 950 described below with reference to FIG. 9 and/or one or more functional abstraction layers (e.g., quantum software, etc.) described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, etc.), quantum hardware, and/or quantum software (e.g., quantum computing device, quantum computer, quantum processor, quantum circuit simulation software, superconducting circuit, etc.) that can be employed by model selection visualization system 102 and/or components thereof to execute one or more operations in accordance with one or more embodiments of the subject disclosure described herein. For instance, model selection visualization system 102 and/or components thereof can employ such one or more classical and/or quantum computing resources to execute one or more classical and/or quantum: mathematical function, calculation, and/or equation; computing and/or processing script; algorithm; model (e.g., artificial intelligence (AI) model, machine learning (ML) model, etc.); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Returning now to FIG. 1, model selection visualization system 102 can comprise a memory 104, a processor 106, an interaction backend handler component 108, a visualization render component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or model selection visualization system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1 or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to model selection visualization system 102, interaction backend handler component 108, visualization render component 110, and/or another component associated with model selection visualization system 102 (e.g., action component 202) as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

Model selection visualization system 102, memory 104, processor 106, interaction backend handler component 108, visualization render component 110, and/or another component of model selection visualization system 102 as described herein (e.g., action component 202) can be communicatively, electrically, operatively, and/or optically coupled to one another via a bus 112 to perform functions of system 100, model selection visualization system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments of the subject disclosure.

Model selection visualization system 102 can comprise any type of component, machine, device, facility, apparatus, and/or instrument that comprises a processor and/or can be capable of effective and/or operative communication with a wired and/or wireless network. All such embodiments are envisioned. For example, model selection visualization system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Model selection visualization system 102 can be coupled (e.g., communicatively, electrically, operatively, optically, etc.) to one or more external systems, sources, and/or devices (e.g., classical and/or quantum computing devices, communication devices, etc.) via a data cable (e.g., High-Definition Multimedia Interface (HDMI), recommended standard (RS) 232, Ethernet cable, etc.). In some embodiments, model selection visualization system 102 can be coupled (e.g., communicatively, electrically, operatively, optically, etc.) to one or more external systems, sources, and/or devices (e.g., classical and/or quantum computing devices, communication devices, etc.) via a network.

In some embodiments, such a network can comprise wired and wireless networks, including, but not limited to, a cellular network, a wide area network (WAN) (e.g., the Internet) or a local area network (LAN). For example, model selection visualization system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, model selection visualization system 102 can thus include hardware (e.g., a central processing unit (CPU), a transceiver, a decoder, quantum hardware, a quantum processor, etc.), software (e.g., a set of threads, a set of processes, software in execution, quantum pulse schedule, quantum circuit, quantum gates, etc.) or a combination of hardware and software that facilitates communicating information between model selection visualization system 102 and external systems, sources, and/or devices (e.g., computing devices, communication devices, etc.).

Model selection visualization system 102 can comprise one or more computer and/or machine readable, writable, and/or executable components and/or instructions that, when executed by processor 106 (e.g., a classical processor, a quantum processor, etc.), can facilitate performance of operations defined by such component(s) and/or instruction(s). Further, in numerous embodiments, any component associated with model selection visualization system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, interaction backend handler component 108, visualization render component 110, and/or any other components associated with model selection visualization system 102 (e.g., action component 202) as disclosed herein (e.g., communicatively, electronically, operatively, and/or optically coupled with and/or employed by model selection visualization system 102), can comprise such computer and/or machine readable, writable, and/or executable component(s) and/or instruction(s). Consequently, according to numerous embodiments, model selection visualization system 102 and/or any components associated therewith as disclosed herein, can employ processor 106 to execute such computer and/or machine readable, writable, and/or executable component(s) and/or instruction(s) to facilitate performance of one or more operations described herein with reference to model selection visualization system 102 and/or any such components associated therewith.

Model selection visualization system 102 can facilitate (e.g., via processor 106) performance of operations executed by and/or associated with interaction backend handler component 108, visualization render component 110, and/or another component associated with model selection visualization system 102 as disclosed herein (e.g., action component 202). For example, as described in detail below, model selection visualization system 102 can facilitate via processor 106 (e.g., a classical processor, a quantum processor, etc.): obtaining one or more assessment metrics of a model pipeline candidate; and/or rendering a progress visualization of the model pipeline candidate based on the one or more assessment metrics.

In another example, as described in detail below, model selection visualization system 102 can further facilitate via processor 106 (e.g., a classical processor, a quantum processor, etc.): rendering the progress visualization in at least one of a progress map, a tree based visualization, a relationship map, or a leaderboard; rendering a ranking of multiple model pipeline candidates based on assessment metrics of the multiple model pipeline candidates; and/or performing at least one of a stop operation, a save operation, or a discard operation corresponding to the model pipeline candidate based on input from an entity, thereby facilitating at least one of improved selection of a model in a model selection process, improved performance of a processor (e.g., processor 106) in executing the model selection process, or reduced computational costs of the processor in executing the model selection process.

In another example, as described in detail below, where the progress visualization comprises an interactive progress visualization, model selection visualization system 102 can further facilitate via processor 106 (e.g., a classical processor, a quantum processor, etc.) rendering a tooltip visualization comprising at least one of a textual representation or a numerical representation of the one or more assessment metrics based on selection of the interactive progress visualization. In the examples above: the one or more assessment metrics can be selected from a group consisting of an optimization metric, a performance metric, a data allocation metric, a training data used metric, and a build time metric; and/or the progress visualization can comprise a visual representation of the one or more assessment metrics.

Interaction backend handler component 108 can obtain one or more assessment metrics of a model pipeline candidate. For example, interaction backend handler component 108 can obtain one or more assessment metrics corresponding to a model pipeline candidate being evaluated in a model selection process such as, for instance, an automated model selection process, an automated machine learning model selection process, an automated machine learning pipeline selection process, an automated artificial intelligence model selection process, an automated artificial intelligence pipeline selection process, and/or another model selection process. In several embodiments, such one or more assessment metrics can include, but are not limited to: an optimization metric (e.g., a mean squared error metric of an estimator); a performance metric (e.g., prediction accuracy of an estimator); a data allocation metric (e.g., a percentage of training data allocated to a model in a model selection process); a training data used metric (e.g., a snapshot of a percentage of training data already used to train a certain model as of a certain time in a model selection process); a build time metric (e.g., the total amount of time it takes to build a model in a model selection process); and/or another assessment metric.

To obtain such one or more assessment metrics defined above, in some embodiments, interaction backend handler component 108 can comprise an agent (e.g., a monitoring agent, an application, software script, processing threads, etc.) that can be implemented in a model selection system (e.g., an automated machine learning model selection system) to monitor runtime evaluation data of one or more components in such a system that evaluate various model candidates and/or various model pipeline candidates. Specifically, in these embodiments, interaction backend handler component 108 can be installed (e.g., deployed over a network defined above) on an evaluation component in a model selection system to monitor runtime evaluation data generated by the evaluation component while analyzing various model candidates (e.g., estimators, classifiers, combinations thereof, etc.) and/or various model pipeline candidates (e.g., various combinations of transformers, estimators, classifiers, enhancements, etc.). In these embodiments, interaction backend handler component 108 can monitor runtime evaluation data corresponding to each model candidate and/or each model pipeline candidate analyzed by the evaluation component. In these embodiments, interaction backend handler component 108 can monitor such runtime evaluation data corresponding to each model candidate and/or each model pipeline candidate while the evaluation component analyzes each model candidate and/or each model pipeline candidate (e.g., in real-time, during runtime analysis of each model candidate and/or each model pipeline candidate, etc.). In these embodiments, as described below, interaction backend handler component 108 can further obtain such runtime evaluation data corresponding to each model candidate and/or each model pipeline candidate analyzed by the evaluation component while the evaluation component analyzes each model candidate and/or each model pipeline candidate (e.g., in real-time, during runtime analysis of each model candidate and/or each model pipeline candidate, etc.).

In some embodiments, interaction backend handler component 108 can obtain (e.g., by executing copy and paste instructions using processor 106) such runtime evaluation data (e.g., runtime evaluation data corresponding to each model candidate and/or each model pipeline candidate analyzed by the evaluation component) directly from the evaluation component (e.g., from a structured data source and/or an unstructured data source that can be generated by the evaluation component, from runtime traces (e.g., runtime process traces), etc.). In some embodiments, interaction backend handler component 108 can obtain (e.g., by executing copy and paste instructions using processor 106) such runtime evaluation data from a memory component on which the evaluation component can store such runtime evaluation data (e.g., from a structured data source and/or an unstructured data source that can be generated by the evaluation component and stored on a memory component such as, for instance, memory 104, a cache memory, etc.).

In some embodiments, interaction backend handler component 108 can employ a model to extract such runtime evaluation data directly from the evaluation component (e.g., from a structured data source and/or an unstructured data source that can be generated by the evaluation component, from runtime traces (e.g., runtime process traces), etc.). In some embodiments, interaction backend handler component 108 can employ a model to extract such runtime evaluation data directly from a memory component on which the evaluation component can store such runtime evaluation data (e.g., from a structured data source and/or an unstructured data source that can be generated by the evaluation component and stored on a memory component such as, for instance, memory 104, a cache memory, etc.). In these embodiments, to facilitate such extraction, interaction backend handler component 108 can employ, for instance, a machine learning model based on artificial intelligence and natural language processing (NLP), including, but not limited to, a shallow or deep neural network model, a convolutional neural network (CNN) model, a long short-term memory (LSTM) model, a support vector machine (SVM) model, a decision tree classifier, and/or any supervised or unsupervised machine learning model that can facilitate such extraction described above.

In various embodiments, the above described runtime evaluation data that can be obtained by interaction backend handler component 108 can comprise one or more of the assessment metrics defined above that can correspond to a model candidate and/or a model pipeline candidate being analyzed by the above described evaluation component. In these embodiments, interaction backend handler component 108 can intermittently and/or continuously obtain and/or send such one or more assessment metrics to visualization render component 110, where visualization render component 110 can render a progress visualization of such a model candidate and/or a model pipeline candidate based on the one or more assessment metrics.

In various embodiments, interaction backend handler component 108 can intermittently and/or continuously obtain and/or send the above described runtime evaluation data to visualization render component 110, where such runtime evaluation data can comprise one or more of the assessment metrics defined above. In these embodiments, visualization render component 110 can use such one or more assessment metrics to render, and/or to update a previous rendering of, one or more progress visualizations corresponding to one or more model candidates and/or one or more model pipeline candidates being evaluated by a model selection system. For example, as described below, visualization render component 110 can use such one or more assessment metrics defined above to render, and/or to update a previous rendering of, one or more progress visualizations including, but not limited to: a visualization of a model selection process (e.g., a progress map, a tree based visualization, a relationship map, a leaderboard visualization, etc.); an interactive visualization of a model selection process (e.g., an interactive progress map, an interactive tree based visualization, an interactive relationship map, an interactive leaderboard visualization, etc.); and/or an interactive progress visualization (e.g., a graphical control element or an animated graphical control element such as, for instance, a mouseover, a tooltip, a progress indicator, an accordion, etc.).

In some embodiments, such a progress visualization can comprise a progress map (e.g., an interactive progress map), a tree based visualization (e.g., an interactive tree based visualization), a relationship map (e.g., an interactive relationship map), and/or a leaderboard (e.g., an interactive leaderboard). For example, in these embodiments, such a progress visualization can comprise a visual representation of one or more of the assessment metrics defined above, where such a visual representation can be in the form of, for instance, a progress map (e.g., an interactive progress map), a tree based visualization (e.g., an interactive tree based visualization), a relationship map (e.g., an interactive relationship map), and/or a leaderboard (e.g., an interactive leaderboard).

In some embodiments, such a progress visualization can comprise a visual representation of one or more of the assessment metrics defined above. In these embodiments, such a progress visualization can further comprise an interactive progress visualization that visualization render component 110 can render in an interactive visualization of a model selection process. For example, in these embodiments, such a progress visualization can comprise an interactive progress visualization, representing one or more of the assessment metrics defined above, that visualization render component 110 can render in an interactive visualization of a model selection process including, but not limited to, an interactive progress map, an interactive tree based visualization, an interactive relationship map, an interactive leaderboard visualization, and/or another interactive visualization of a model selection process. For instance, in these embodiments, such a progress visualization can comprise an interactive progress visualization such as, for example, a graphical control element (e.g., a mouseover, a tooltip, a progress indicator, an accordion, etc.) or an animated graphical control element (e.g., a throbber, etc.) that visualization render component 110 can render in one or more of the interactive visualizations of a model selection process defined above.

In various embodiments, visualization render component 110 can use such one or more assessment metrics that can be provided by interaction backend handler component 108 to intermittently and/or continuously render, and/or update a previous rendering of, such one or more progress visualizations described above. For example, as described above, in some embodiments, interaction backend handler component 108 can continuously obtain and/or send such one or more assessment metrics to visualization render component 110 (e.g., in real-time, during runtime analysis of each model candidate and/or each model pipeline candidate, etc.). In these embodiments, visualization render component 110 can use such one or more assessment metrics to continuously render, and/or update a previous rendering of, such one or more progress visualizations described above (e.g., in real-time, during runtime analysis of each model candidate and/or each model pipeline candidate, etc.).

To facilitate such rendering of the one or more progress visualizations as described above, visualization render component 110 can employ one or more rendering applications and/or techniques (e.g., rendering application(s), rendering script(s), etc.). For example, visualization render component 110 can employ a rendering application such as, for instance, a real-time rendering application that can enable visualization render component 110 to render the one or more progress visualizations described above while an evaluation component in a model selection system analyzes a model candidate and/or a model pipeline candidate (e.g., in real-time, during runtime analysis of each model candidate and/or each model pipeline candidate, etc.). In some embodiments, visualization render component 110 can employ such a real-time rendering application to render one or more of the progress visualizations described above as one or more interactive components (e.g., a mouseover, a tooltip, a progress indicator, an accordion, etc.) in one or more of the interactive visualizations of a model selection process defined above.

Figure 2:
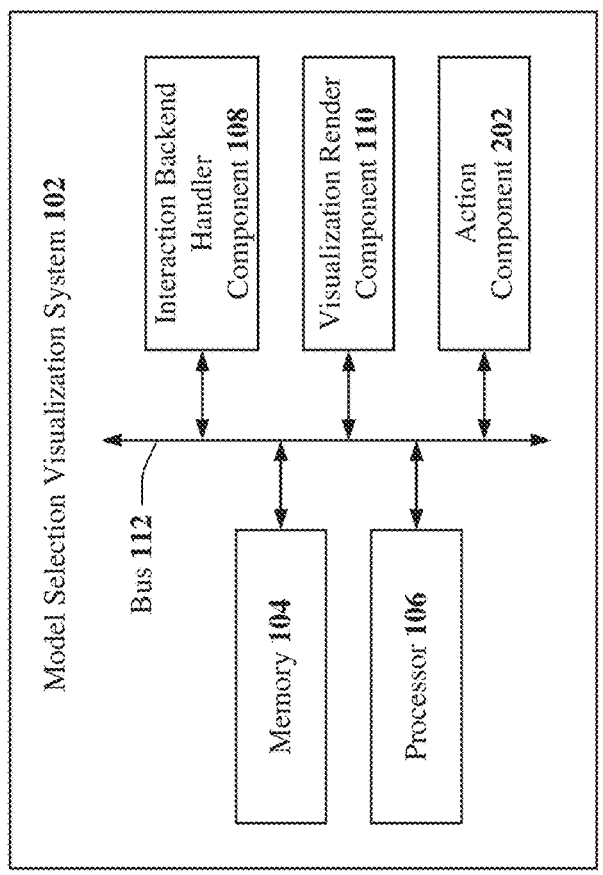

FIG. 2 illustrates a block diagram of an example, non-limiting system 200 that can facilitate visualization of a model selection process in accordance with one or more embodiments described herein. System 200 can comprise model selection visualization system 102, which can further comprise an action component 202. Repetitive description of like elements and/or processes employed in respective embodiments is omitted for sake of brevity.

Action component 202 can perform at least one of a stop operation, a save operation, or a discard operation corresponding to a model pipeline candidate based on input from an entity. For instance, an entity (e.g., a human, a client, a user, a computing device, a software application, an agent, a machine learning model, an artificial intelligence model, etc.) can engage action component 202 to perform one or more of such stop, save, or discard operations by using an interface component of model selection visualization system 102 (not illustrated in the figures) including, but not limited to, an application programming interface (API), a representational state transfer API, a graphical user interface (GUI), and/or another interface component.

In various embodiments, action component 202 can be represented visually in an interactive visualization as an interactive graphical control element such as, for example, a "stop" button that can be rendered in such an interactive visualization by visualization render component 110 (e.g., via a real-time rendering application). In some embodiments, action component 202 can be activated when an entity engages such a "stop" button (e.g., selects or clicks the "stop" button via an input device such as, for instance, a mouse). In these embodiments, when such an entity engages such a "stop" button, action component 202 can stop (e.g., immediately end) a current analysis of a model candidate and/or a model pipeline candidate that is being evaluated and/or trained by a model selection system (e.g., by an evaluation component of such a model selection system). In some embodiments, for instance, embodiments where evaluation and/or training of a model candidate and/or a model pipeline candidate involves computationally expensive operations and/or involves a relatively long model training duration (e.g., several hours, a day, a week, etc.), by enabling an entity to stop a current analysis of a model candidate and/or a model pipeline candidate that is being evaluated and/or trained by a model selection system, model selection visualization system 102 and/or action component 202 can thereby facilitate: improved selection of a model in a model selection process; improved performance of a processor (e.g., processor 106) in executing the model selection process; and/or reduced computational costs of the processor in executing the model selection process. In some embodiments, when an entity engages such a "stop" button to stop a current analysis of a model candidate and/or a model pipeline candidate that is being evaluated and/or trained by a model selection system, action component 202 can further discard (e.g., delete) the model candidate and/or the model pipeline candidate, thereby facilitating improved storage capacity of a memory component (e.g., a cache memory, memory 104, etc.) that would otherwise store such a model candidate and/or model pipeline candidate during a model selection process.

In some embodiments, action component 202 can be activated when one or more run criteria have been satisfied. In these embodiments, a determination as to whether one or more of such run criteria has been satisfied can be made by interaction backend handler component 108 as it monitors the analysis of one or more model candidates and/or one or more model pipeline candidates evaluated and/or trained in a model selection process (e.g., as it monitors the one or more assessment metrics defined above with reference to FIG. 1). For example, in these embodiments, an entity as defined above with reference to FIG. 1 that can implement model selection visualization system 102 can define (e.g., via an API, a REST API, a GUI, etc.) a maximum build time (e.g., a not to exceed build time) associated with model candidates and/or model pipeline candidates being evaluated and/or trained in a model selection process. In these embodiments, if interaction backend handler component 108 determines that such a defined maximum build time has been met and/or exceeded with respect to a model candidate and/or a model pipeline candidate that is being evaluated and/or trained in a model selection process, action component 202 can stop (e.g., immediately end) a current analysis of such a model candidate and/or model pipeline candidate. In some embodiments, for instance, embodiments where evaluation and/or training of a model candidate and/or a model pipeline candidate involves computationally expensive operations and/or involves a relatively long model training duration (e.g., several hours, a day, a week, etc.), by enabling action component 202 to stop a current analysis of a model candidate and/or a model pipeline candidate that has met and/or exceeded a defined maximum build time in a model selection process, model selection visualization system 102 and/or action component 202 can thereby facilitate: improved selection of a model in a model selection process; improved performance of a processor (e.g., processor 106) in executing the model selection process; and/or reduced computational costs of the processor in executing the model selection process. In some embodiments, when action component 202 stops a current analysis of a model candidate and/or a model pipeline candidate that has met and/or exceeded a defined maximum build time in a model selection process, action component 202 can further discard (e.g., delete) the model candidate and/or the model pipeline candidate, thereby facilitating improved storage capacity of a memory component (e.g., a cache memory, memory 104, etc.) that would otherwise store such a model candidate and/or model pipeline candidate during the model selection process.

In various embodiments, action component 202 can be represented visually in an interactive visualization as an interactive graphical control element such as, for example, a "save" button that can be rendered in such an interactive visualization by visualization render component 110 (e.g., via a real-time rendering application). In some embodiments, when an entity engages such a "save" button (e.g., selects or clicks the "save" button via an input device such as, for instance, a mouse), action component 202 can save (e.g., immediately) a model candidate and/or a model pipeline candidate that has been evaluated and/or trained by a model selection system (e.g., by an evaluation component of such a model selection system). In these embodiments, when an entity engages such a "save" button, action component 202 can save (e.g., in memory 104) the model candidate and/or the model pipeline candidate that has been evaluated and/or trained by the model selection system. In these embodiments, by enabling an entity to save a model candidate and/or a model pipeline candidate that has been evaluated by a model selection system, model selection visualization system 102 and/or action component 202 can thereby facilitate improved selection of a model in a model selection process (e.g., improved entity experience in selecting a model using a model selection process).

Figure 3:
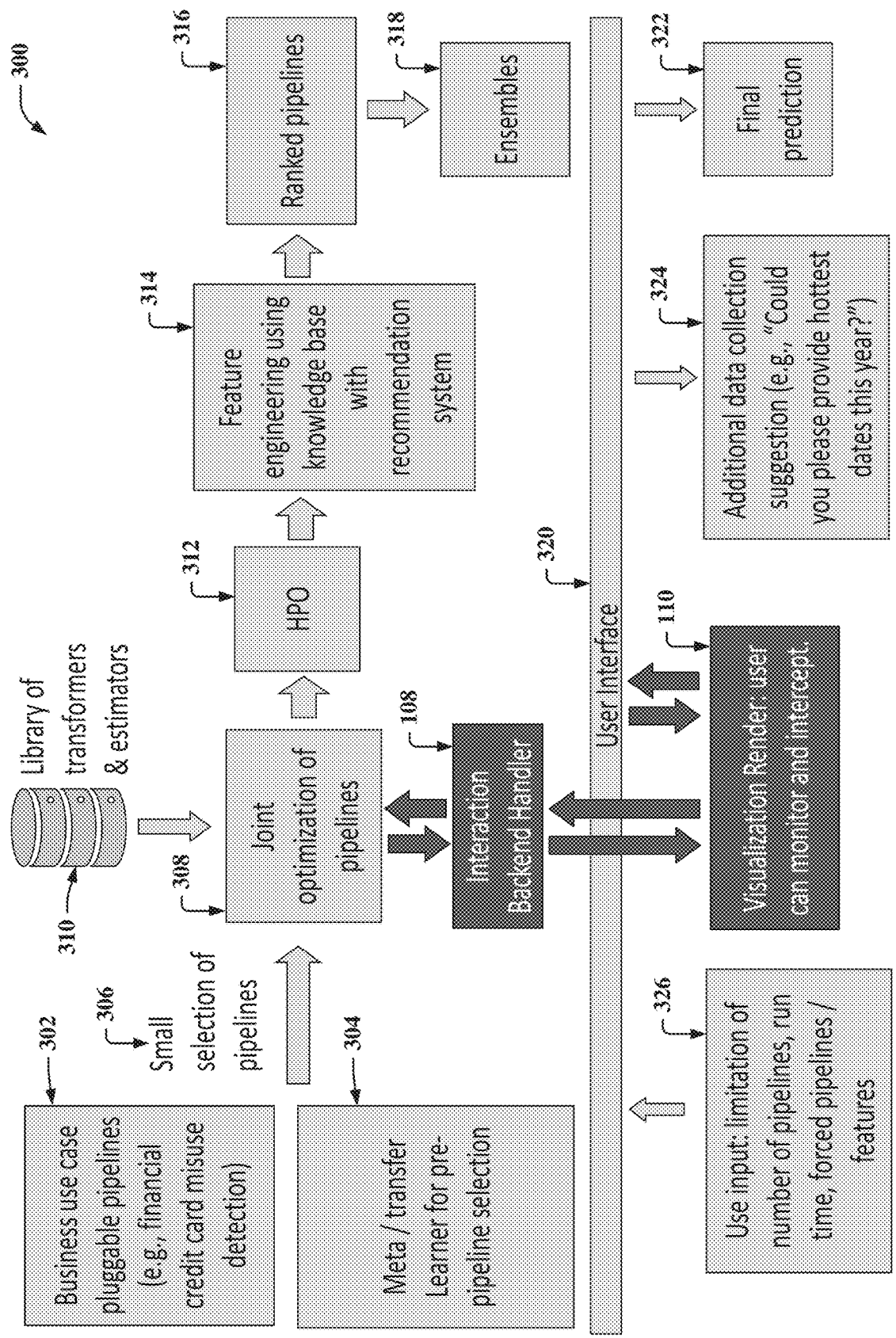
FIG. 3 illustrates a diagram of an example, non-limiting system that can facilitate visualization of a model selection process in accordance with one or more embodiments described herein.

FIG. 3 illustrates a diagram of an example, non-limiting system 300 that can facilitate visualization of a model selection process in accordance with one or more embodiments described herein. Repetitive description of like elements and/or processes employed in respective embodiments is omitted for sake of brevity.

System 300 can comprise a model selection system. In some embodiments, system 300 can comprise a model selection system that can execute a model selection process including, but not limited to, an automated model selection process, an automated machine learning model selection process, an automated machine learning pipeline selection process, an automated artificial intelligence model selection process, an automated artificial intelligence pipeline selection process, and/or another model selection process.

System 300 depicted in the example embodiment illustrated in FIG. 3 can comprise an optimization component 308 (denoted as Joint optimization of pipelines in FIG. 3) that can obtain one or more preselected model pipelines 306 (denoted as "Small selection of pipelines" in FIG. 3) based on input 302 (denoted as "Business use case pluggable pipelines (e.g., financial credit card misuse detection)" in FIG. 3) and/or input 304 (denoted as "Meta/transfer Learner for pre-pipeline selection" in FIG. 3). As illustrated in the example embodiment depicted in FIG. 3, optimization component 308 can further receive one or more transformers and one or more estimators from a library component 310 (e.g., a database and/or a memory device, denoted as "Library of transformers & estimators" in FIG. 3).

In the example embodiment illustrated in FIG. 3, system 300 can comprise the model selection system described above with reference to FIGS. 1 and 2 and optimization component 308 can comprise the evaluation component in such a model selection system described above that can analyze one or more model candidates and/or one or more model pipeline candidates in a model selection process. For instance, in the example embodiment depicted in FIG. 3, optimization component 308 can analyze one or more preselected model pipelines 306 using one or more transformers and/or estimators obtained from library component 310. In this example embodiment, interaction backend handler component 108 can obtain (e.g., as described above with reference to FIG. 1), from optimization component 308, runtime evaluation data comprising one or more of the assessment metrics defined above with reference to FIG. 1 that correspond to one or more preselected model pipelines 306 that can be evaluated by optimization component 308 in the model selection process depicted in FIG. 3.

As described above with reference to FIG. 1 and as illustrated in the example embodiment depicted in FIG. 3, interaction backend handler component 108 can provide (e.g., in real-time, during runtime analysis of each model candidate and/or each model pipeline candidate, etc.) such one or more assessment metrics to visualization render component 110. In this example embodiment, as described above with reference to FIG. 1, visualization render component 110 can use such one or more assessment metrics to render, and/or to update a previous rendering of, one or more of the progress visualizations defined above that can correspond to one or more preselected model pipelines 306 that can be evaluated by optimization component 308 in the model selection process depicted in FIG. 3.

In the example embodiment illustrated in FIG. 3, visualization render component 110 can provide such rendering(s) of one or more of the progress visualizations defined above with reference to FIG. 1 to a user interface component 320 (denoted as "User Interface" in FIG. 3) of system 300, where user interface component 320 can comprise an interface component including, but not limited to, an application programming interface (API), a representational state transfer API, a graphical user interface (GUI), and/or another interface component. In this example embodiment, user interface component 320 can display such rendering(s) of one or more of the progress visualizations defined above on an output device (not illustrated in FIG. 3) such as, for instance, a monitor, a screen, a display, and/or another output device.

In the example embodiment illustrated in FIG. 3, an entity as defined above with reference to FIG. 1 that implements system 300 and/or model selection visualization system 102 can monitor (e.g., in real-time, during runtime analysis of each preselected model pipeline 306, etc.) such one or more assessment metrics corresponding to the one or more preselected model pipelines 306 that can be evaluated by optimization component 308. For instance, in this example embodiment, such an entity can monitor (e.g., via a monitor, a screen, a display, etc.) such one or more assessment metrics that can be rendered (e.g., by visualization render component 110 via user interface component 320) as one or more of such progress visualizations defined above.

In embodiments where one or more of such progress visualizations defined above comprise an interactive progress visualization (e.g., a drop-down list, a button, etc.), an entity as defined above with reference to FIG. 1 that implements system 300 and/or model selection visualization system 102 can engage (e.g., click, select, etc.) such an interactive progress visualization(s) through user interface component 320 using an input device such as, for instance, a keyboard, a mouse, a digital pen, and/or another input device. For example, in some embodiments, as described above with reference to FIG. 2, such an interactive progress visualization can comprise a "stop" button. In these embodiments, when an entity engages such a "stop" button (e.g., selects or clicks the "stop" button via user interface component 320 using an input device such as, for instance, a mouse), action component 202 can stop (e.g., immediately end) a current analysis of a certain model pipeline candidate in the one or more preselected model pipelines 306 that are being evaluated by optimization component 308 in the model selection process depicted in FIG. 3. In other embodiments, such an interactive progress visualization can comprise a drop-down list that enables such an entity to instruct system 300 (e.g., ranking component 316 described below)

to rank the one or more preselected model pipelines 306 that can be evaluated by optimization component 308 based on one or more certain criteria such as, for instance, based on a mean squared error (MSE) technique.

As illustrated in the example embodiment depicted in FIG. 3, based on evaluation and/or optimization of the one or more preselected model pipelines 306 by optimization component 308, one or more hyperparameters of such one or more preselected model pipelines 306 can be adjusted by a hyperparameter optimization component 312 (denoted as "HPO" in FIG. 3). For example, in this embodiment, hyperparameter optimization component 312 can adjust such hyperparameters to achieve some result that can be defined by an entity defined above with reference to FIG. 1 that can implement system 300 and/or model selection visualization system 102. In the example embodiment illustrated in FIG. 3, based on such hyperparameter adjustment(s), a feature engineering component 314 (denoted as Feature engineering using knowledge base with recommendation system in FIG. 3) can perform one or more feature engineering operations with respect to the one or more preselected model pipelines 306. In this example embodiment, based on such feature engineering, a ranking component 316 (denoted as "Ranked pipelines" in FIG. 3) can rank the preselected model pipelines 306. For example, such an entity defined above that can implement system 300 and/or model selection visualization system 102 can instruct ranking component 316 to rank such preselected model pipelines 306 based on a certain criterion such as, for instance, based on an MSE technique as described above.

In the example embodiment illustrated in FIG. 3, system 300 and/or ranking component 316 can provide (e.g., via user interface component 320 and an output device such as, for instance, a monitor) one or more of the preselected model pipelines 306 that can be evaluated by optimization component 308 to an entity defined above with reference to FIG. 1 that can implement system 300 and/or model selection visualization system 102. For instance, in this example embodiment, ranking component 316 can provide one or more of the preselected model pipelines 306 as ensembles 318 (denoted as "Ensembles" in FIG. 3) that can comprise, for example, combinations of the one or more transformers and estimators that can be obtained from library component 310. In this example embodiment, such an entity defined above that can implement system 300 and/or model selection visualization system 102 can further implement (e.g., execute via user interface component 320) one or more of such ensembles 318 to obtain a final prediction 322 as illustrated in FIG. 3.

In some embodiments, during such model selection process illustrated in the example embodiment depicted in FIG. 3, system 300 can submit (e.g., via user interface component 320 and an output device such as, for instance, a monitor, etc.) one or more information requests 324 (denoted as Additional data collection suggestion (e.g., "Could you please provide hottest dates this year?")) to such an entity defined above that can implement system 300 and/or model selection visualization system 102. In this example embodiment, such an entity can provide (e.g., via user interface component 320 and an output device such as, for instance, a monitor, etc.) a response to such information request(s) 324 to system 300 (e.g., to optimization component 308, hyperparameter optimization component 312, feature engineering component 314, ranking component 316, etc.). In this example embodiment, such an entity can further provide (e.g., via user interface component 320 and an output device such as, for instance, a monitor, etc.) use input 326 (denoted as "Use input: limitation of number of pipelines, run time, forced pipelines/features" in FIG. 3) to system 300 (e.g., to optimization component 308, hyperparameter optimization component 312, feature engineering component 314, ranking component 316, etc.). For instance, in this example embodiment, such an entity can provide use input 326 including, but not limited to: a) a defined number (e.g., 5, 10, etc.) of preselected model pipelines 306 that can be analyzed by optimization component 308; b) a defined run time (e.g., a defined pipeline build time and/or a defined ensemble build time such as, for instance, 1 second, 1 minute, etc.); c) forced pipelines (e.g., certain model pipeline candidates such an entity wants optimization component 308 to analyze); and/or d) forced features (e.g., certain data features (e.g., training data features) such an entity wants feature engineering component 314 to use in performing one or more feature engineering operations).

Figure 4:
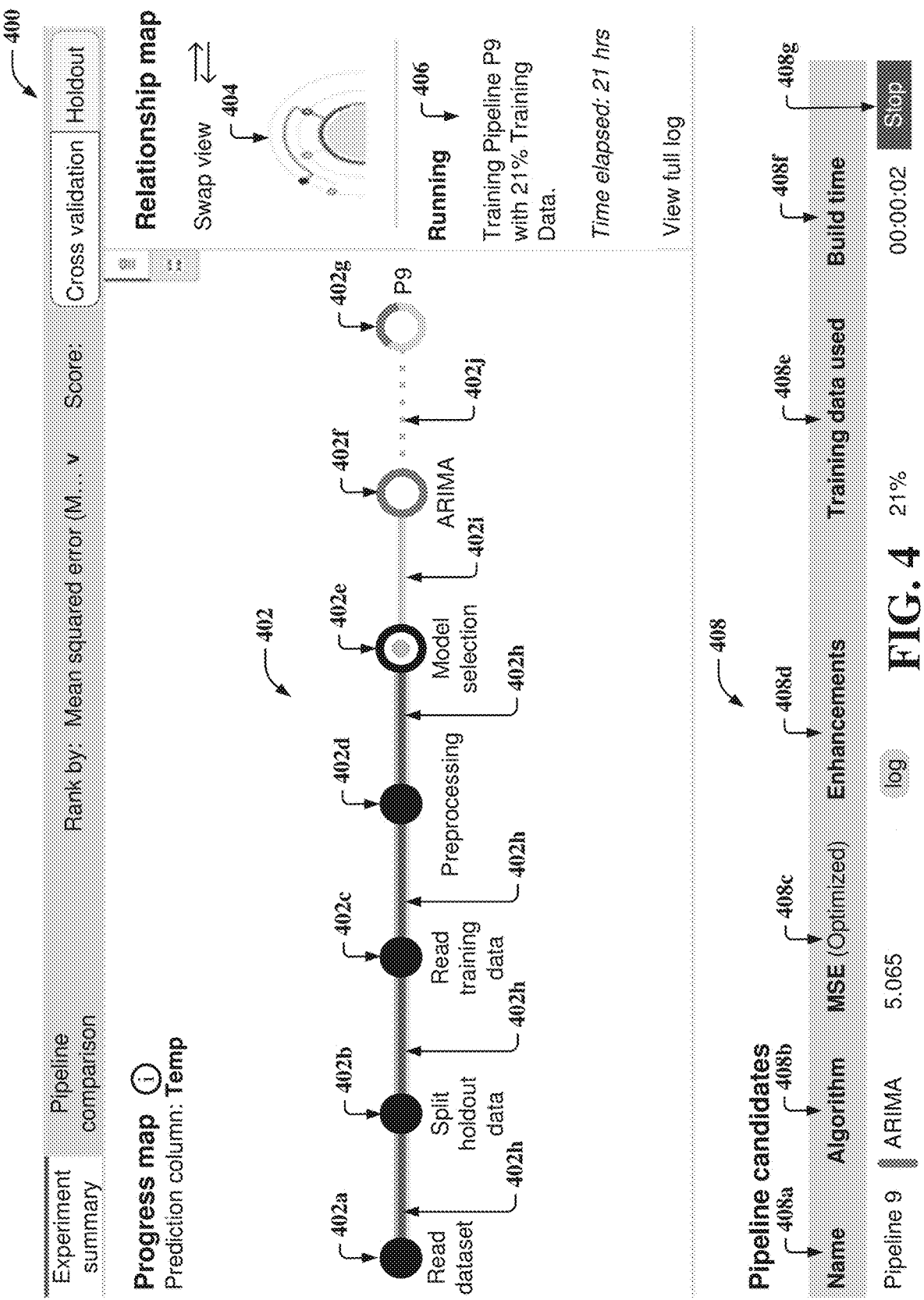
FIGS. 4, 5, and 6 illustrate diagrams of example, non-limiting visualizations that can facilitate visualization of a model selection process in accordance with one or more embodiments described herein.

FIG. 4 illustrates a diagram of an example, non-limiting visualization 400 that can facilitate visualization of a model selection process in accordance with one or more embodiments described herein. Repetitive description of like elements and/or processes employed in respective embodiments is omitted for sake of brevity.

Visualization 400 can comprise an example, non-limiting visualization that can be rendered by visualization render component 110 as described above with reference to FIG. 1 (e.g., via one or more rendering applications and/or techniques (e.g., a real-time rendering application), etc.). As illustrated in the example embodiment depicted in FIG. 4, visualization render component 110 can render one or more progress visualizations comprising, for instance, a progress map 402, a relationship map 404, a process status report 406, and/or a leaderboard 408.

In the example embodiment illustrated in FIG. 4, progress map 402 can comprise a progress visualization that can be rendered by visualization render component 110 based on (e.g., using) one or more of the assessment metrics defined above with reference to FIG. 1 that can be obtained by interaction backend handler component 108 as described above. For instance, in the example embodiment illustrated in FIG. 4, progress map 402 can comprise an interactive progress map (e.g., an interactive tree based visualization). In this example embodiment, progress map 402 can comprise progress visualizations 402a, 402b, 402c, 402d, 402e, 402f and/or 402g. In this example embodiment, progress visualizations 402a, 402b, 402c, 402d, and 402e can represent and/or correspond to various operations in a model selection process that can be performed by a model selection system (e.g., via system 300 described above with reference to FIG. 3). As illustrated in the example embodiment depicted in FIG. 4: progress visualization 402a can represent a read dataset operation; progress visualization 402b can represent a split holdout data operation; progress visualization 402c can represent a read training data operation; progress visualization 402d can represent a preprocessing operation; progress visualization 402e can represent a model selection operation; progress visualization 402f can represent a model pipeline evaluation operation; and progress visualization 402g can represent a model pipeline training operation.

As illustrated in the example embodiment depicted in FIG. 4, visualization render component 110 can render progress visualizations 402a, 402b, 402c, 402d, 402e, 402f, and/or 402g as a variety of shapes (e.g., circles, dots, rings, etc.). In this example embodiment, visualization render component 110 can also render progress visualizations 402a, 402b, 402c, 402d, 402e, 402f, and/or 402g with various visual attributes (e.g., colors, etc.). In some embodiments, visualization render component 110 can render progress visualizations 402a, 402b, 402c, and 402d as solid black dots to indicate that such operations have been completed. In some embodiments, visualization render component 110 can render progress visualization 402e as a black ring with a light gray dot inside the dot to indicate evaluation and/or training of a model pipeline candidate is in progress. In the above embodiments, progress visualizations 402a, 402b, 402c, 402d, and/or 402e can comprise progress visualizations that can be rendered by visualization render component 110 based on (e.g., using) one or more of the assessment metrics defined above with reference to FIG. 1 that can be obtained by interaction backend handler component 108 as described above.

In some embodiments, visualization render component 110 can render progress visualization 402f as a dark gray ring to indicate evaluation and/or training of a model pipeline candidate comprising, for instance, an autoregressive integrated moving average (ARIMA) model is in progress. In some embodiments, visualization render component 110 can render progress visualization 402g as a two-tone light gray and dark gray ring to indicate training of a model pipeline candidate comprising, for instance, an ARIMA model is in progress. In these embodiments, visualization render component 110 can further render progress visualization 402g such that the size of the dark gray portion of the ring indicates the amount of training data that has been used to train a model pipeline candidate comprising, for instance, an ARIMA model. For example, when 20 percent (%) of the training data has been used to train a model pipeline candidate (e.g., comprising an ARIMA model), visualization render component 110 can render progress visualization 402g such that the dark gray portion of the ring fills 20% of the ring. In this example, as more of the training data is used to train a model pipeline candidate (e.g., comprising an ARIMA model), visualization render component 110 can render progress visualization 402g such that the size of the dark gray portion of the ring increases to reflect such additional allocation of the training data to train such a model pipeline candidate. In the above embodiments, progress visualizations 402e, 402f, and/or 402g can comprise progress visualizations that can be rendered by visualization render component 110 based on (e.g., using) one or more of the assessment metrics defined above with reference to FIG. 1 that can be obtained by interaction backend handler component 108 as described above.

In the example embodiment illustrated in FIG. 4, progress map 402 can further comprise progress visualizations 402h, 402i, and/or 402j that can comprise polylines that can represent a model pipeline candidate that is being evaluated by an evaluation component (e.g., optimization component 308 described above with reference to FIG. 3) in a model selection system (e.g., system 300 described above with reference to FIG. 3). In this example embodiment, based on evaluation status of such a model pipeline candidate (e.g., optimizing and/or evaluating, training, complete, etc.) visualization render component 110 can render such polylines with various visual attributes (e.g., colors, line weight, dash type, etc.). As illustrated in the example embodiment depicted in FIG. 4, visualization render component 110 can render progress visualization 402h as a solid dark gray line to indicate completion of one or more previous operations. In this example embodiment, visualization render component 110 can render progress visualization 402i as a solid light gray line to indicate evaluation of a certain model pipeline candidate is in progress. In this example embodiment, visualization render component 110 can render progress visualization 402j as a dashed light gray line to indicate training of a certain model pipeline is in progress. In the above embodiments, progress visualizations 402h, 402i, and/or 402j can comprise progress visualizations that can be rendered by visualization render component 110 based on (e.g., using) one or more of the assessment metrics defined above with reference to FIG. 1 that can be obtained by interaction backend handler component 108 as described above.

In the example embodiment illustrated in FIG. 4, relationship map 404 can comprise an example, non-limiting alternative embodiment of progress map 402 described above. In this example embodiment, visualization render component 110 can render the progress visualizations (not illustrated in FIG. 4) in relationship map 404 using the same or different shapes and/or visual attributes used to render progress visualizations 402a, 402b, 402c, 402d, 402e, 402f, 402g, 402h, 402i, and 402j in progress map 402 (e.g., to enable convenient matching of such progress visualizations in progress map 402 with those in relationship map 404).

In the example embodiment illustrated in FIG. 4, process status report 406 can comprise a progress visualization that can be rendered by visualization render component 110 such that it displays an alphanumeric status summary of a model selection process. For instance, as illustrated in the example embodiment depicted in FIG. 4, process status report 406 can comprise a progress visualization that can be rendered by visualization render component 110 such that it provides information that, for example, indicates that the model selection process is running, that a pipeline denoted as pipeline P9 is being trained with 21% of the training data, and/or that 21 hours (hrs) have elapsed since the model selection process started.

In the example embodiment illustrated in FIG. 4, leaderboard 408 can comprise a progress visualization that can be rendered by visualization render component 110 based on (e.g., using) one or more of the assessment metrics defined above with reference to FIG. 1 that can be obtained by interaction backend handler component 108 as described above. In some embodiments, leaderboard 408 can comprise an interactive leaderboard. As illustrated in the example embodiment illustrated in FIG. 4, leaderboard 408 can comprise progress visualizations 408a, 408b, 408c, 408d, 408e, and/or 408f. In this example embodiment, as illustrated in FIG. 4: progress visualization 408a can comprise a column in leaderboard 408 that can indicate the name of a model pipeline (e.g., pipeline 9) being evaluated in a model selection process; progress visualization 408b can comprise a column in leaderboard 408 that can indicate the name of an algorithm (e.g., a model such as, for instance, an ARIMA model) being evaluated in a model selection process; progress visualization 408c can comprise a column in leaderboard 408 that can indicate the criterion (e.g., mean squared error (MSE)) used to rank (e.g., via ranking component 316 described above with reference to FIG. 3) multiple model pipelines being evaluated in a model selection process; progress visualization 408d can comprise a column in leaderboard 408 that can indicate the enhancements (e.g., log, difference, flatten, localized flatten, etc.) associated with a model pipeline being evaluated in a model selection process; progress visualization 408e can comprise a column in leaderboard 408 that can indicate the amount (e.g., expressed as a percentage (%)) of training data used to train a model pipeline being evaluated in a model selection process; and/or progress visualization 408f can comprise a column in leaderboard 408 that can indicate the amount of time used to build, analyze, and train a model pipeline being evaluated in a model selection process. In the above embodiments, progress visualizations 408a, 408b, 408c, 408d, 408e, and/or 408f can comprise progress visualizations that can be rendered by visualization render component 110 based on (e.g., using) one or more of the assessment metrics defined above with reference to FIG. 1 that can be obtained by interaction backend handler component 108 as described above.

In the example embodiment illustrated in FIG. 4, leaderboard 408 can further comprise an interactive visualization 408g that can be rendered by visualization render component 110 as described above with reference to FIG. 1. In this example embodiment, interactive visualization 408g can be coupled (e.g., communicatively, electrically, operatively, etc.) to action component 202 described above with reference to FIG. 2. In this example embodiment, interactive visualization 408g can comprise an interactive graphical control element such as, for example, a "stop" button. In some embodiments, when an entity engages such a "stop" button (e.g., selects or clicks the "stop" button via an input device such as, for instance, a mouse), action component 202 can stop (e.g., immediately end) a current analysis of a model candidate and/or a model pipeline candidate that is being evaluated by a model selection system (e.g., by optimization component 308 of system 300 described above with reference to FIG. 3).

Figure 5:
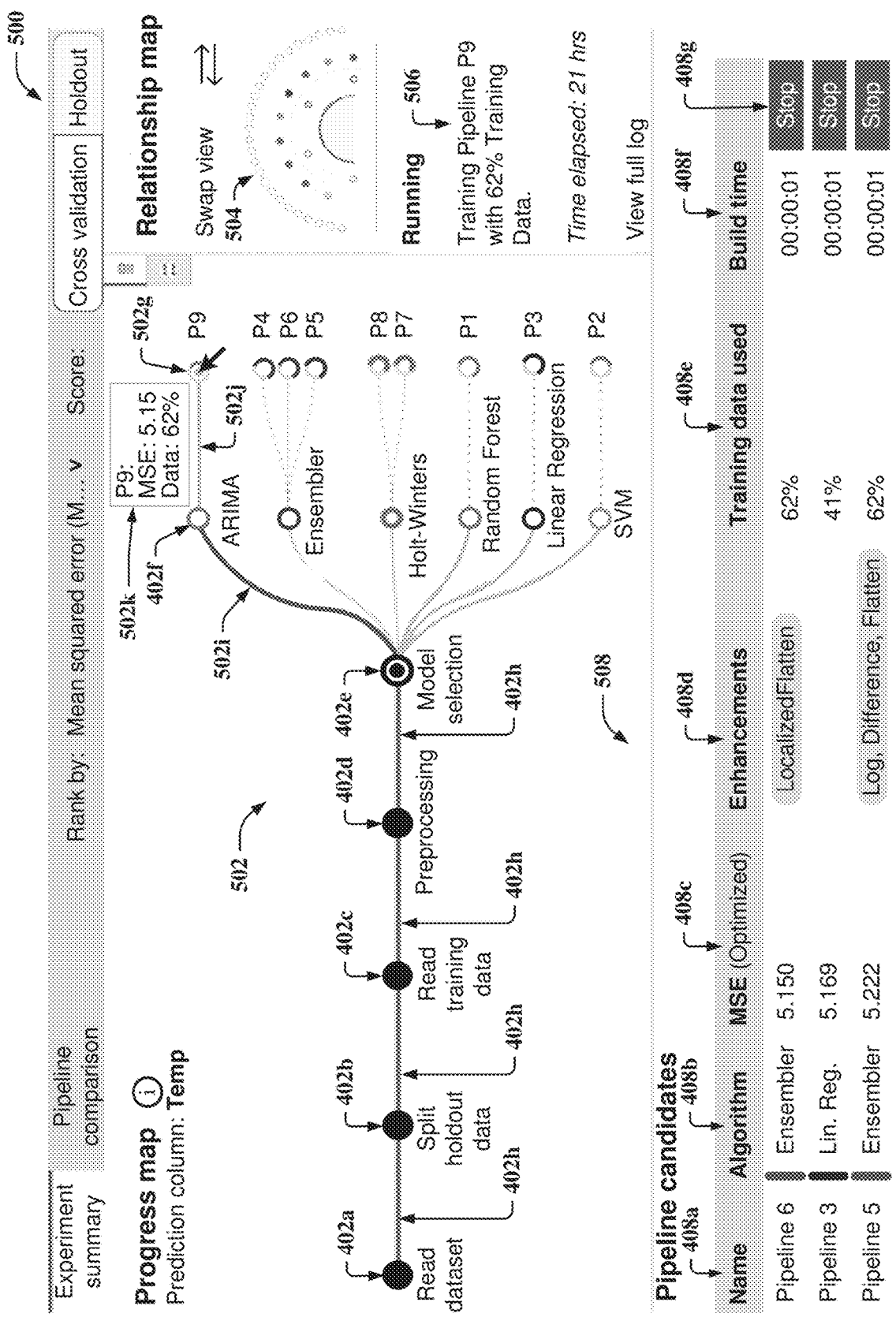

FIG. 5 illustrates a diagram of an example, non-limiting visualization 500 that can facilitate visualization of a model selection process in accordance with one or more embodiments described herein. Repetitive description of like elements and/or processes employed in respective embodiments is omitted for sake of brevity.

Visualization 500 can comprise an example, non-limiting alternative embodiment of visualization 400 described above with reference to FIG. 4. In the example embodiment illustrated in FIG. 5, visualization 500 can comprise a progress map 502, a relationship map 504, a process status report 506, and/or a leaderboard 508 that can be rendered by visualization render component 110 as described above with reference to FIG. 1 (e.g., via one or more rendering applications and/or techniques (e.g., a real-time rendering application), etc.). In this example embodiment, progress map 502 can comprise an example, non-limiting alternative embodiment of progress map 402 described above with reference to FIG. 4, where progress map 502 can comprise multiple model pipeline candidates being evaluated in a model selection process. For instance, as illustrated in the example embodiment depicted in FIG. 5, progress map 502 can comprise: a pipeline 1 (P1) having a random forest model; a pipeline 2 (P2) having a support vector machine (SVM) model; a pipeline 3 (P3) having a linear regression model (denoted in FIG. 5 as "Linear Regression" and "Lin. Reg."); a pipeline 4 (P4) having an ensembler model, a first transformer, and/or a first estimator; a pipeline 5 (P5) having an ensembler model, a second transformer, and/or a second estimator; a pipeline 6 (P6) having an ensembler model, a third transformer, and/or a third estimator; a pipeline 7 (P7) having a Holt-Winters model, a first transformer, and/or a first estimator; a pipeline 8 (P8) having an ensembler model, a second transformer, and/or a second estimator; and/or a pipeline 9 (P9) having an ARIMA model.

In the example embodiment illustrated in FIG. 5, progress map 502 can further comprise a progress visualization 502g that can comprise an example, non-limiting alternative embodiment of progress visualization 402g described above with reference to FIG. 4. In this example embodiment, progress visualization 502g can comprise an interactive graphical control element such as, for example, a mouseover. In this example embodiment, when an entity engages such a mouseover (e.g., by hovering a cursor of a mouse over progress visualization 502g as depicted by the black arrow in FIG. 5 and/or selecting progress visualization 502g using the mouse), visualization render component 110 can render a tooltip visualization 502k in progress map 502, for instance. In this example embodiment, tooltip visualization 502k can comprise a textual representation and/or a numerical representation of one or more of the assessment metrics defined above with reference to FIG. 1.

In the above example embodiment, when progress visualization 502g is activated as described above (e.g., via hovering a cursor of a mouse over it and/or selecting it with a mouse), visualization render component 110 can further: render a progress visualization 502i (e.g., a polyline representing a model pipeline candidate that is being evaluated in a model selection process) as a solid dark gray line as depicted in FIG. 5 to indicate that, for instance, pipeline 9 (P9) has been selected; and/or render a progress visualization 502j (e.g., a polyline representing a model pipeline candidate that is being evaluated and/or trained in a model selection process) as a solid light gray line as depicted in FIG. 5 to indicate that, for instance, pipeline 9 (P9) has been selected. In the above embodiments, progress visualizations 502g, 502i, and/or 502j and/or tooltip visualization 502k can comprise progress visualizations that can be rendered by visualization render component 110 based on (e.g., using) one or more of the assessment metrics defined above with reference to FIG. 1 that can be obtained by interaction backend handler component 108 as described above.

In the example embodiment illustrated in FIG. 5, relationship map 504 can comprise an example, non-limiting alternative embodiment of relationship map 404 described above with reference to FIG. 4, where visualization render component 110 can render relationship map 504 such that it corresponds with progress map 502 and/or with one or more model pipeline candidates in progress map 502 (e.g., P1, P2, P3, P4, P5, P6, P7, P8, P9, etc.). In the example embodiment illustrated in FIG. 5, process status report 506 can comprise an example, non-limiting alternative embodiment of process status report 406 described above with reference to FIG. 4, where visualization render component 110 can render process status report 506 such that the alphanumeric status summary in process status report 506 corresponds with progress map 502 and/or with one or more model pipeline candidates in progress map 502 (e.g., P1, P2, P3, P4, P5, P6, P7, P8, P9, etc.). In the example embodiment illustrated in FIG. 5, leaderboard 508 can comprise an example, non-limiting alternative embodiment of leaderboard 408 described above with reference to FIG. 4, where visualization render component 110 can render leaderboard 508 such that the information in leaderboard 508 corresponds with progress map 502 and/or with one or more model pipeline candidates in progress map 502 (e.g., P1, P2, P3, P4, P5, P6, P7, P8, P9, etc.).

Figure 6:
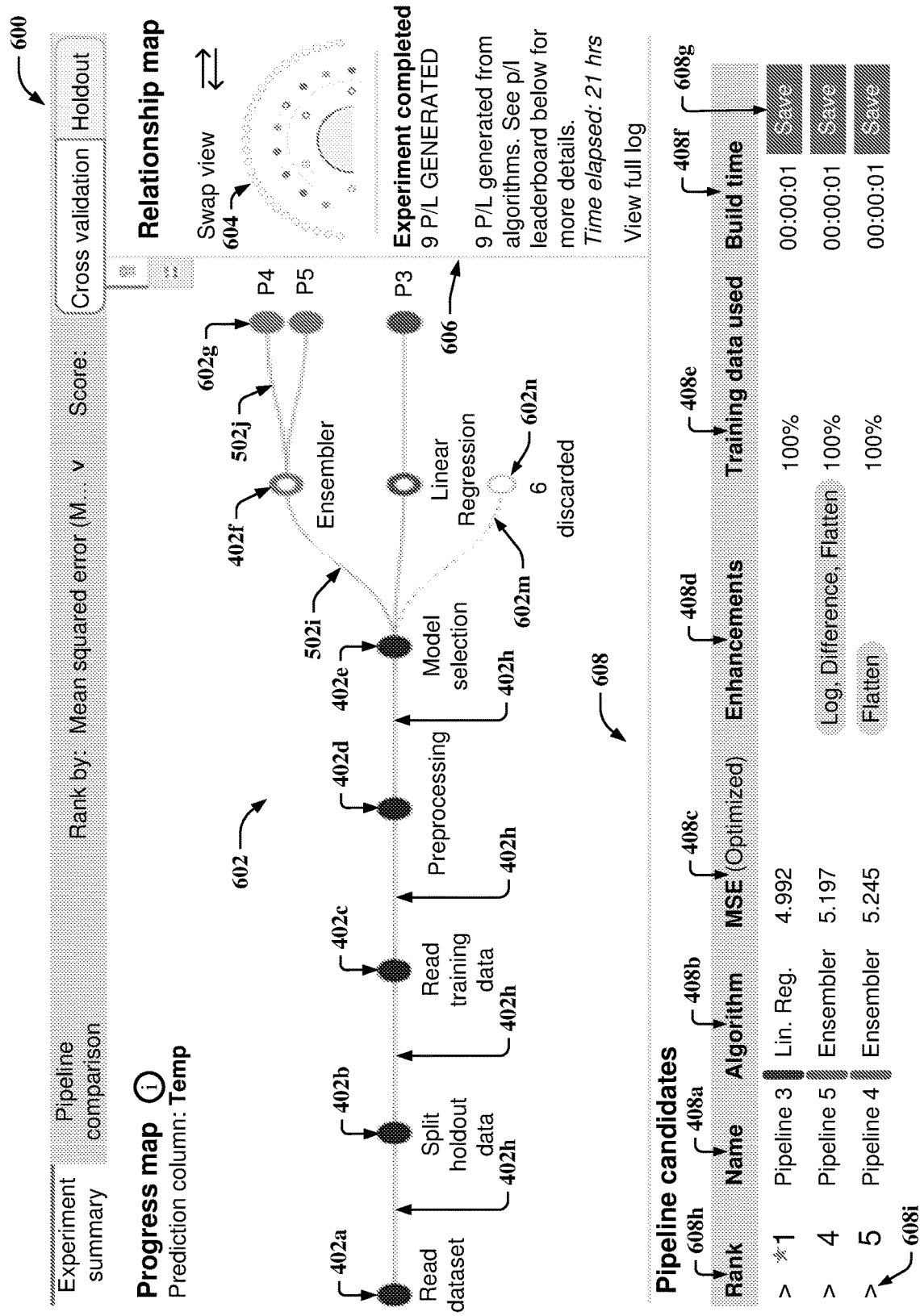

FIG. 6 illustrates a diagram of an example, non-limiting visualization 600 that can facilitate visualization of a model selection process in accordance with one or more embodiments described herein. Repetitive description of like elements and/or processes employed in respective embodiments is omitted for sake of brevity.

Visualization 600 can comprise an example, non-limiting alternative embodiment of visualization 500 described above with reference to FIG. 5. In the example embodiment illustrated in FIG. 6, visualization 600 can comprise a progress map 602, a relationship map 604, a process status report 606, and/or a leaderboard 608 that can be rendered by visualization render component 110 as described above with reference to FIG. 1 (e.g., via one or more rendering applications and/or techniques (e.g., a real-time rendering application), etc.). In this example embodiment, progress map 602 can comprise an example, non-limiting alternative embodiment of progress map 502 described above with reference to FIG. 5, where progress map 602 can comprise multiple model pipeline candidates for which evaluation and/or training has been completed and/or that have been selected by, for instance, an entity as defined above that can implement model selection visualization system 102. For instance, as illustrated in the example embodiment depicted in FIG. 6, progress map 602 can comprise: a pipeline 3 (P3) having a linear regression model (denoted in FIG. 6 as "Linear Regression" and "Lin. Reg."); a pipeline 4 (P4) having an ensembler model, a first transformer, and/or a first estimator; and/or a pipeline 5 (P5) having an ensembler model, a second transformer, and/or a second estimator.

In the example embodiment illustrated in FIG. 6, progress map 602 can further comprise a progress visualization 602g that can comprise an example, non-limiting alternative embodiment of progress visualization 402g and/or 502g described above with reference to FIGS. 4 and 5, respectively. In this example embodiment, when evaluation and/or training of a model pipeline candidate (e.g., P3, P4, P5, etc.) has been completed in a model selection process and/or when such a model pipeline candidate has been selected (e.g., by an entity implementing model selection visualization system 102), visualization render component 110 can render progress visualization 602g as a solid dark gray dot as illustrated in FIG. 6. In the above embodiments, progress visualization 602g can comprise a progress visualization that can be rendered by visualization render component 110 based on (e.g., using) one or more of the assessment metrics defined above with reference to FIG. 1 that can be obtained by interaction backend handler component 108 as described above.

In the above example embodiment, based on completion of the evaluation and/or training of such a model pipeline candidate in a model selection process and/or based on selection of such a model pipeline candidate as described above, visualization render component 110 can further collapse all other model pipelines that are still being evaluated and/or trained, and/or that have not been selected, into a single pipeline that can be represented as progress visualization 602m and 602n in progress map 602. In this example embodiment, progress visualization 602m can comprise a polyline representing one or more model pipeline candidates that are still being evaluated and/or trained in a model selection process and/or that have not been selected, where visualization render component 110 can render progress visualization 602m as a dashed light gray line as depicted in FIG. 6. In this example embodiment, progress visualization 602n can comprise a ring representing ongoing evaluation and/or training of one or more model pipeline candidates and/or representing that such model pipeline candidate(s) has not been selected, where visualization render component 110 can render progress visualization 602n as a light gray ring as depicted in FIG. 6. In the above embodiments, progress visualizations 602m and/or 602n can comprise progress visualizations that can be rendered by visualization render component 110 based on (e.g., using) one or more of the assessment metrics defined above with reference to FIG. 1 that can be obtained by interaction backend handler component 108 as described above.

In the example embodiment illustrated in FIG. 6, relationship map 604 can comprise an example, non-limiting alternative embodiment of relationship map 504 described above with reference to FIG. 5, where visualization render component 110 can render relationship map 604 such that it corresponds with progress map 602 and/or with one or more model pipeline candidates in progress map 602 (e.g., P3, P4, P5, etc.). In the example embodiment illustrated in FIG. 6, process status report 606 can comprise an example, non-limiting alternative embodiment of process status report 506 described above with reference to FIG. 5, where visualization render component 110 can render process status report 606 such that the alphanumeric status summary in process status report 606 corresponds with progress map 602 and/or with one or more model pipeline candidates in progress map 602 (e.g., P3, P4, P5, etc.).

In the example embodiment illustrated in FIG. 6, leaderboard 608 can comprise an example, non-limiting alternative embodiment of leaderboard 508 described above with reference to FIG. 5, where leaderboard 608 can comprise a progress visualization 608h and/or 608i. In this example embodiment, progress visualization 608h can comprise a column in leaderboard 608 that can indicate the ranking position (e.g., the rank) of each model pipeline candidate evaluated and/or trained in a model selection process, where such ranking can be determined with respect to all other model pipeline candidates evaluated and/or trained in the model selection process. In this example embodiment, the ranking position of each model pipeline candidate can be determined by a ranking component in a model selection system (e.g., by ranking component 316 in system 300 described above with reference to FIG. 3) and based on such ranking determination, visualization render component 110 can render such ranking position as progress visualization 608h in leaderboard 608. In this example embodiment, progress visualization 608i can comprise a graphical control element such as, for instance, drop-down list and/or an accordion that can be expanded and/or collapsed when engaged (e.g., when selected and/or clicked by an entity via an input device such as, for instance, a mouse) to display additional details and/or assessment metrics associated with a certain model pipeline candidate (e.g., P3, P4, P5, etc.). In the above embodiments, progress visualizations 608h and/or 608i can comprise progress visualizations that can be rendered by visualization render component 110 based on (e.g., using) one or more of the assessment metrics defined above with reference to FIG. 1 that can be obtained by interaction backend handler component 108 as described above.

In the example embodiment illustrated in FIG. 6, leaderboard 608 can further comprise an interactive visualization 608g that can be rendered by visualization render component 110 as described above with reference to FIG. 1. In this example embodiment, interactive visualization 608g can be coupled (e.g., communicatively, electrically, operatively, etc.) to action component 202 described above with reference to FIG. 2. In this example embodiment, interactive visualization 608g can comprise an interactive graphical control element such as, for example, a "save" button. In some embodiments, when an entity engages such a "save" button (e.g., selects or clicks the "save" button via an input device such as, for instance, a mouse), action component 202 can save a model candidate and/or a model pipeline candidate that has been evaluated and/or trained in a model selection process by a model selection system (e.g., by optimization component 308 of system 300 described above with reference to FIG. 3). In these embodiments, when an entity engages such a "save" button, action component 202 can save (e.g., in memory 104) the model candidate and/or the model pipeline candidate that has been evaluated and/or trained by the model selection system.

Figure 7A:
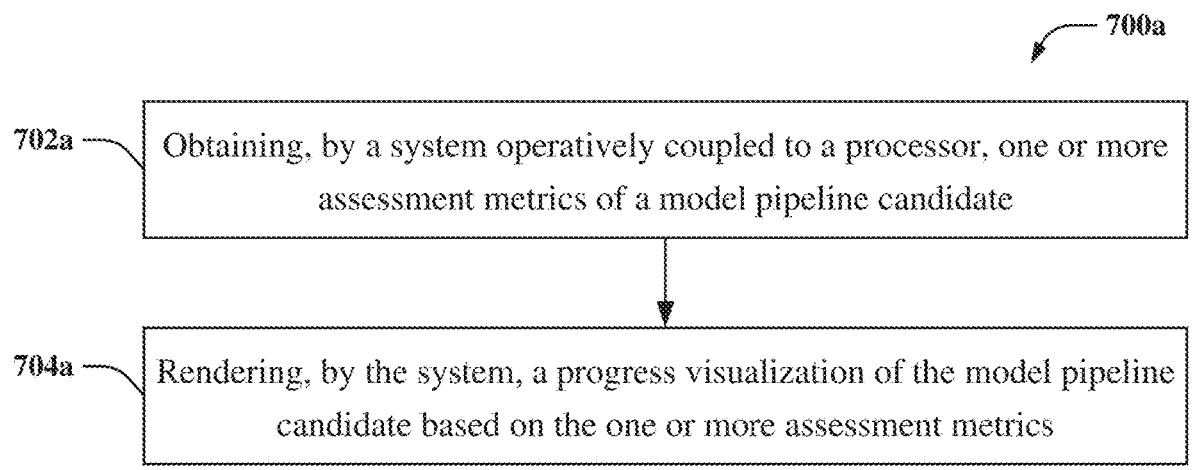
FIGS. 7A and 7B illustrate flow diagrams of example, non-limiting computer-implemented methods that can facilitate visualization of a model selection process in accordance with one or more embodiments described herein.

FIG. 7A illustrates a flow diagram of an example, non-limiting computer-implemented method 700a that can facilitate visualization of a model selection process in accordance with one or more embodiments described herein. Repetitive description of like elements and/or processes employed in respective embodiments is omitted for sake of brevity.

At 702a, computer-implemented method 700a can comprise obtaining, by a system (e.g., via model selection visualization system 102 and/or interaction backend handler component 108) operatively coupled to a processor (e.g., processor 106), one or more assessment metrics (e.g., an optimization metric, a performance metric, a data allocation metric, a training data used metric, a build time metric, etc.) of a model pipeline candidate (e.g., a model pipeline candidate being evaluated in a model selection process such as, for instance, P1, P2, P3, P4, P5, P6, P7, P8, and/or P9 described above and illustrated in FIGS. 4, 5, and 6).

At 704a, computer-implemented method 700a can comprise rendering, by the system (e.g., via model selection visualization system 102 and/or visualization render component 110), a progress visualization (e.g., one or more of the progress visualizations and/or tooltip visualization described above and/or illustrated in FIGS. 1-6) of the model pipeline candidate based on the one or more assessment metrics.

Figure 7B:
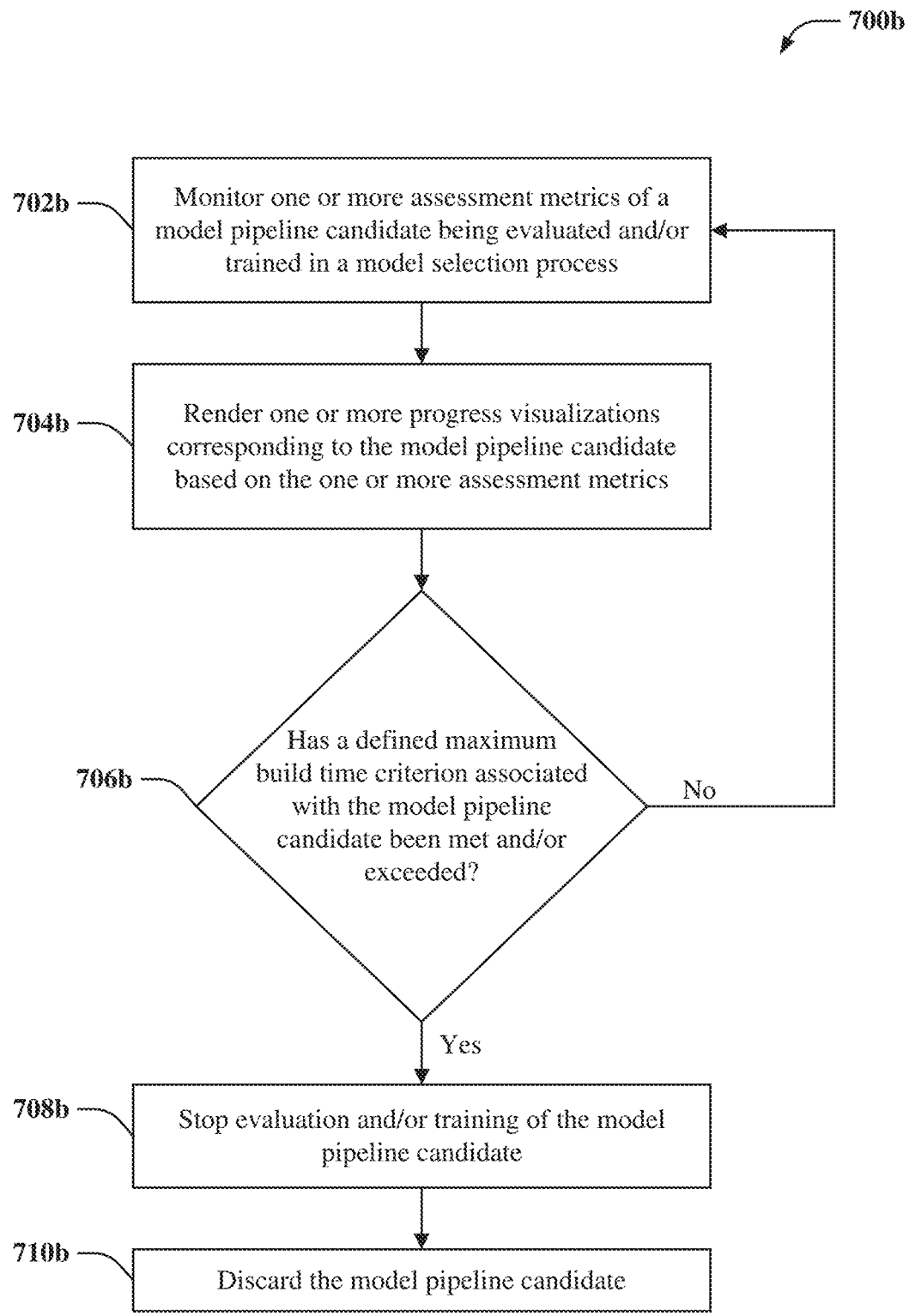

FIG. 7B illustrates a flow diagram of an example, non-limiting computer-implemented method 700b that can facilitate visualization of a model selection process in accordance with one or more embodiments described herein. Repetitive description of like elements and/or processes employed in respective embodiments is omitted for sake of brevity.

At 702b, computer-implemented method 700b can comprise monitoring (e.g., via model selection visualization system 102 and/or interaction backend handler component 108) one or more assessment metrics (e.g., an optimization metric, a performance metric, a data allocation metric, a training data used metric, a build time metric, etc.) of a model pipeline candidate (e.g., a model pipeline candidate being evaluated in a model selection process such as, for instance, P1, P2, P3, P4, P5, P6, P7, P8, and/or P9 described above and illustrated in FIGS. 4, 5, and 6) being evaluated and/or trained in a model selection process (e.g., a model selection process that can be performed by, for instance, system 300 as described above and illustrated in FIG. 3).

At 704b, computer-implemented method 700b can comprise rendering (e.g., via model selection visualization system 102 and/or visualization render component 110) one or more progress visualizations corresponding to the model pipeline candidate (e.g., one or more of the progress visualizations and/or tooltip visualization described above and/or illustrated in FIGS. 1-6) based on the one or more assessment metrics.

At 706b, computer-implemented method 700b can comprise determining (e.g., via model selection visualization system 102 and/or interaction backend handler component 108) whether a defined maximum build time criterion associated with the model pipeline candidate has been met and/or exceeded. For example, as described above with reference to FIG. 2, a determination as to whether a run criteria such as, for instance, a defined maximum build time has been satisfied can be made by interaction backend handler component 108 as it monitors the evaluation and/or training of a model pipeline candidate being analyzed in a model selection process (e.g., as it monitors the one or more assessment metrics defined above that correspond with such a model pipeline candidate).

If it is determined at 706b that a defined maximum build time criterion associated with the model pipeline candidate has been met and/or exceeded, at 708b, computer-implemented method 700b can comprise stopping (e.g., via model selection visualization system 102 and/or action component 202) evaluation and/or training (e.g., stopping analysis) of the model pipeline candidate. For example, as described above with reference to FIG. 2, in some embodiments, if interaction backend handler component 108 determines that such a defined maximum build time has been met and/or exceeded with respect to a model pipeline candidate that is being evaluated and/or trained in a model selection process, action component 202 can stop (e.g., immediately end) a current analysis (e.g., evaluation and/or training) of such a model candidate and/or model pipeline candidate. In some embodiments, for instance, embodiments where evaluation and/or training of a model candidate and/or a model pipeline candidate involves computationally expensive operations and/or involves a relatively long model training duration (e.g., several hours, a day, a week, etc.), by enabling action component 202 to stop a current analysis of a model candidate and/or a model pipeline candidate that has met and/or exceeded a defined maximum build time in a model selection process, model selection visualization system 102 and/or action component 202 can thereby facilitate: improved selection of a model in a model selection process; improved performance of a processor (e.g., processor 106) in executing the model selection process; and/or reduced computational costs of the processor in executing the model selection process.

At 710b, computer-implemented method 700b can comprise discarding (e.g., via model selection visualization system 102 and/or action component 202) the model pipeline candidate. For example, as described above with reference to FIG. 2, in some embodiments, when action component 202 stops a current analysis (e.g., evaluation and/or training) of a model candidate and/or a model pipeline candidate that has met and/or exceeded a defined maximum build time in a model selection process, action component 202 can further discard (e.g., delete) the model candidate and/or the model pipeline candidate, thereby facilitating improved storage capacity of a memory component (e.g., a cache memory, memory 104, etc.) that would otherwise store such a model candidate and/or model pipeline candidate during the model selection process.

If it is determined at 706b that a defined maximum build time criterion associated with the model pipeline candidate has not been met and/or exceeded, computer-implemented method 700b can comprise returning to 702b to continue monitoring (e.g., via interaction backend handler component 108) the one or more assessment metrics of the model pipeline candidate as described above. In some embodiments, computer-implemented method 700b can repeat operations 702b, 704b, and 706b until it is determined by interaction backend handler component 108 that such a defined maximum build time criterion has been met and/or exceeded. In some embodiments, if an evaluation and/or training of the model pipeline candidate is completed before meeting and/or exceeding the defined maximum build time criterion, computer-implemented method 700b can end.

Model selection visualization system 102 can be associated with various technologies. For example, model selection visualization system 102 can be associated with artificial intelligence technologies, machine learning technologies, automated artificial intelligence technologies, automated machine learning technologies, automated artificial intelligence visualization technologies, automated machine learning visualization technologies, cloud computing technologies, and/or other technologies.

Model selection visualization system 102 can provide technical improvements to systems, devices, components, operational steps, and/or processing steps associated with the various technologies identified above. For example, model selection visualization system 102 can obtain one or more assessment metrics of a model pipeline candidate (e.g., a model pipeline candidate being evaluated and/or trained in a model selection process); and/or render a progress visualization of the model pipeline candidate based on the one or more assessment metrics. In this example, model selection visualization system 102 can further perform a stop operation, a save operation, and/or a discard operation corresponding to the model pipeline candidate based on input from an entity.

In the above example and as described above with reference to FIG. 2, in some embodiments, if interaction backend handler component 108 and/or an entity implementing model selection visualization system 102 determines that a defined maximum build time has been met and/or exceeded with respect to a model pipeline candidate that is being evaluated and/or trained in a model selection process, action component 202 can stop (e.g., immediately end) a current analysis (e.g., evaluation and/or training) of such a model candidate and/or model pipeline candidate. In some embodiments, for instance, embodiments where evaluation and/or training of a model candidate and/or a model pipeline candidate involves computationally expensive operations and/or involves a relatively long model training duration (e.g., several hours, a day, a week, etc.), by enabling such an entity and/or interaction backend handler component 108 to activate action component 202 to stop a current analysis of a model candidate and/or a model pipeline candidate that has met and/or exceeded a defined maximum build time in a model selection process, model selection visualization system 102 and/or action component 202 can thereby facilitate: improved selection of a model in a model selection process (e.g., by enabling an entity as defined herein to monitor and/or intervene in the model selection process in real-time, for instance, during runtime analysis of each model candidate and/or each model pipeline candidate); improved performance of a processor (e.g., processor 106) in executing the model selection process; and/or reduced computational costs of the processor in executing the model selection process.

Additionally, or alternatively, as described above with reference to FIG. 2, in some embodiments, when action component 202 stops a current analysis (e.g., evaluation and/or training) of a model candidate and/or a model pipeline candidate that has met and/or exceeded a defined maximum build time in a model selection process, action component 202 can further discard (e.g., delete) the model candidate and/or the model pipeline candidate. In these embodiments, by enabling action component 202 to discard such a model candidate and/or model pipeline candidate, model selection visualization system 102 can thereby facilitate improved storage capacity of a memory component (e.g., a cache memory, memory 104, etc.) that would otherwise store such a model candidate and/or model pipeline candidate during the model selection process.

Model selection visualization system 102 can provide technical improvements to a processing unit (e.g., processor 106) associated with a classical computing device and/or a quantum computing device (e.g., a quantum processor, quantum hardware, superconducting circuit, etc.) associated with model selection visualization system 102. For example, as described above, by enabling interaction backend handler component 108 and/or an entity implementing model selection visualization system 102 to activate action component 202 to stop a current analysis of a model candidate and/or a model pipeline candidate that has met and/or exceeded a defined maximum build time in a model selection process, model selection visualization system 102 and/or action component 202 can thereby facilitate: improved performance of a processor (e.g., processor 106) in executing the model selection process; and/or reduced computational costs of the processor in executing the model selection process.

A practical application of model selection visualization system 102 is that it can be implemented in a model selection system to facilitate improved selection of a model in a model selection process, for example, by enabling an entity as defined herein to monitor and/or intervene in the model selection process in real-time (e.g., during runtime analysis of each model candidate and/or each model pipeline candidate). For example, a practical application of model selection visualization system 102 is that it can be implemented in an automated machine learning model selection system to enable an entity as defined herein that implements model selection visualization system 102, and/or the automated machine learning model selection system, to monitor and/or intervene in the model selection process such that a model that is selected at the end of such a process is the model that is best suited (e.g., relative to all other model candidates) to achieve a defined objective (e.g., to generate classifications, predictions, and/or estimations that can be used to engineer and/or control another device, system, and/or process).

It should be appreciated that model selection visualization system 102 provides a new approach driven by relatively new model selection systems (e.g., automated machine learning model selection systems). For example, model selection visualization system 102 provides a new approach for an entity as defined herein that implements model selection visualization system 102 and/or the model selection system to monitor and/or intervene in an automated machine learning model selection process to ensure that a machine learning model that is ultimately selected satisfies a defined objective.

Model selection visualization system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, etc.) to execute defined tasks related to the various technologies identified above. Model selection visualization system 102 and/or components thereof, can be employed to solve new problems that arise through advancements in technologies mentioned above, employment of quantum computing systems, cloud computing systems, computer architecture, and/or another technology.

It is to be appreciated that model selection visualization system 102 can utilize various combinations of electrical components, mechanical components, and circuitry that cannot be replicated in the mind of a human or performed by a human, as the various operations that can be executed by model selection visualization system 102 and/or components thereof as described herein are operations that are greater than the capability of a human mind. For instance, the amount of data processed, the speed of processing such data, or the types of data processed by model selection visualization system 102 over a certain period of time can be greater, faster, or different than the amount, speed, or data type that can be processed by a human mind over the same period of time.

According to several embodiments, model selection visualization system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that model selection visualization system 102 can include information that is impossible to obtain manually by an entity, such as a human user. For example, the type, amount, and/or variety of information included in model selection visualization system 102, interaction backend handler component 108, visualization render component 110, action component 202, system 300, visualization 400, visualization 500, and/or visualization 600 can be more complex than information obtained manually by a human user.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
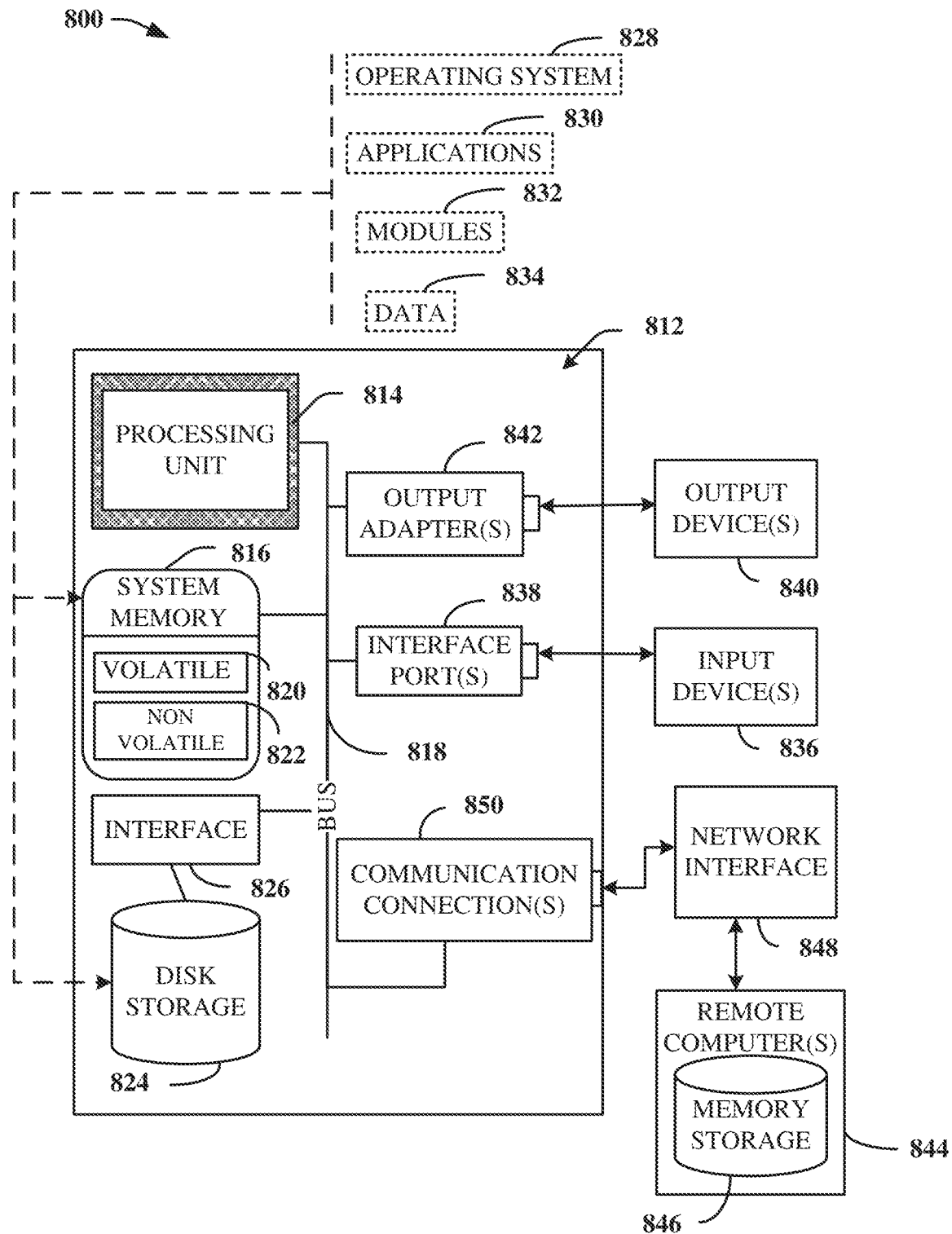
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
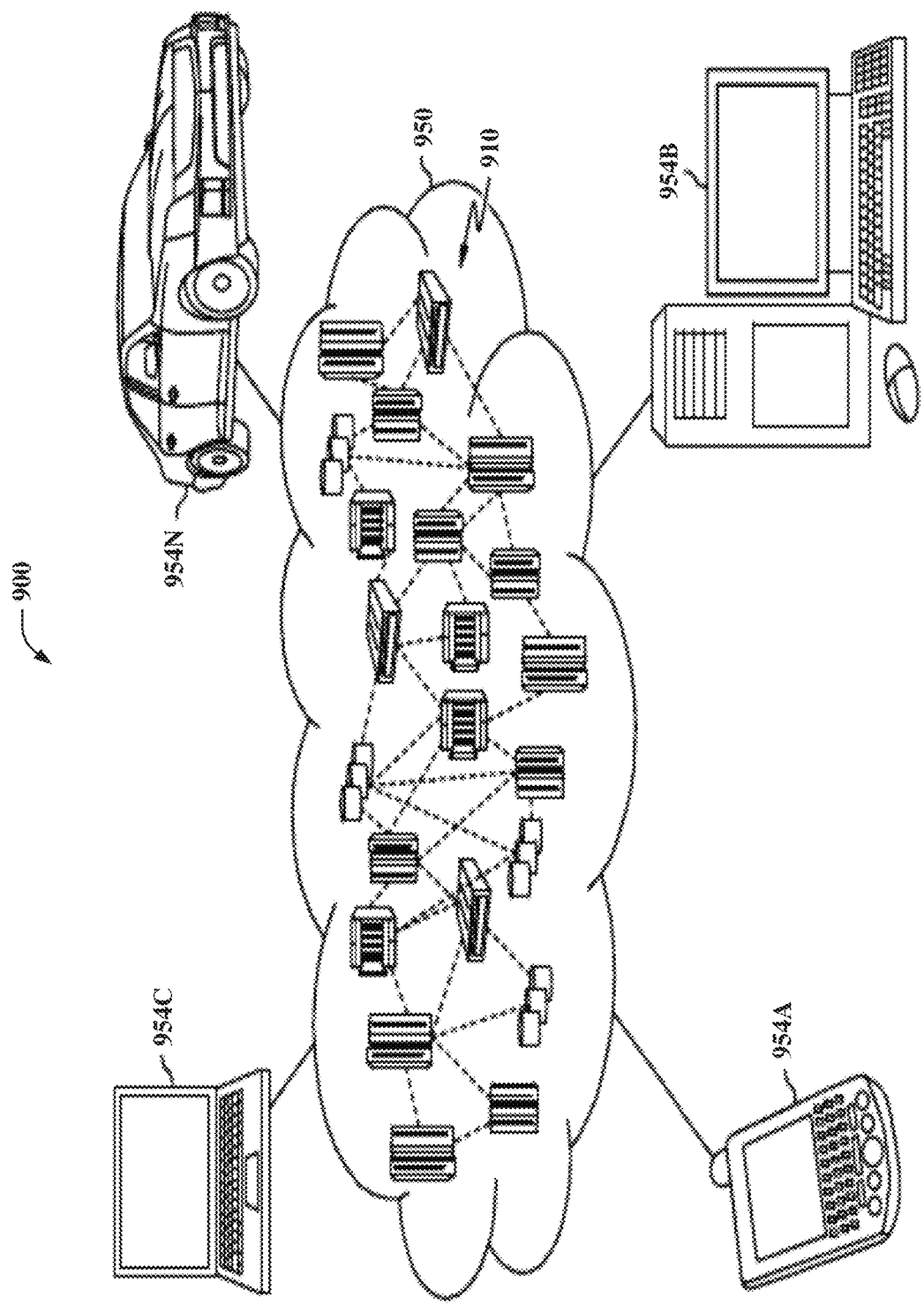
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, etc.) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
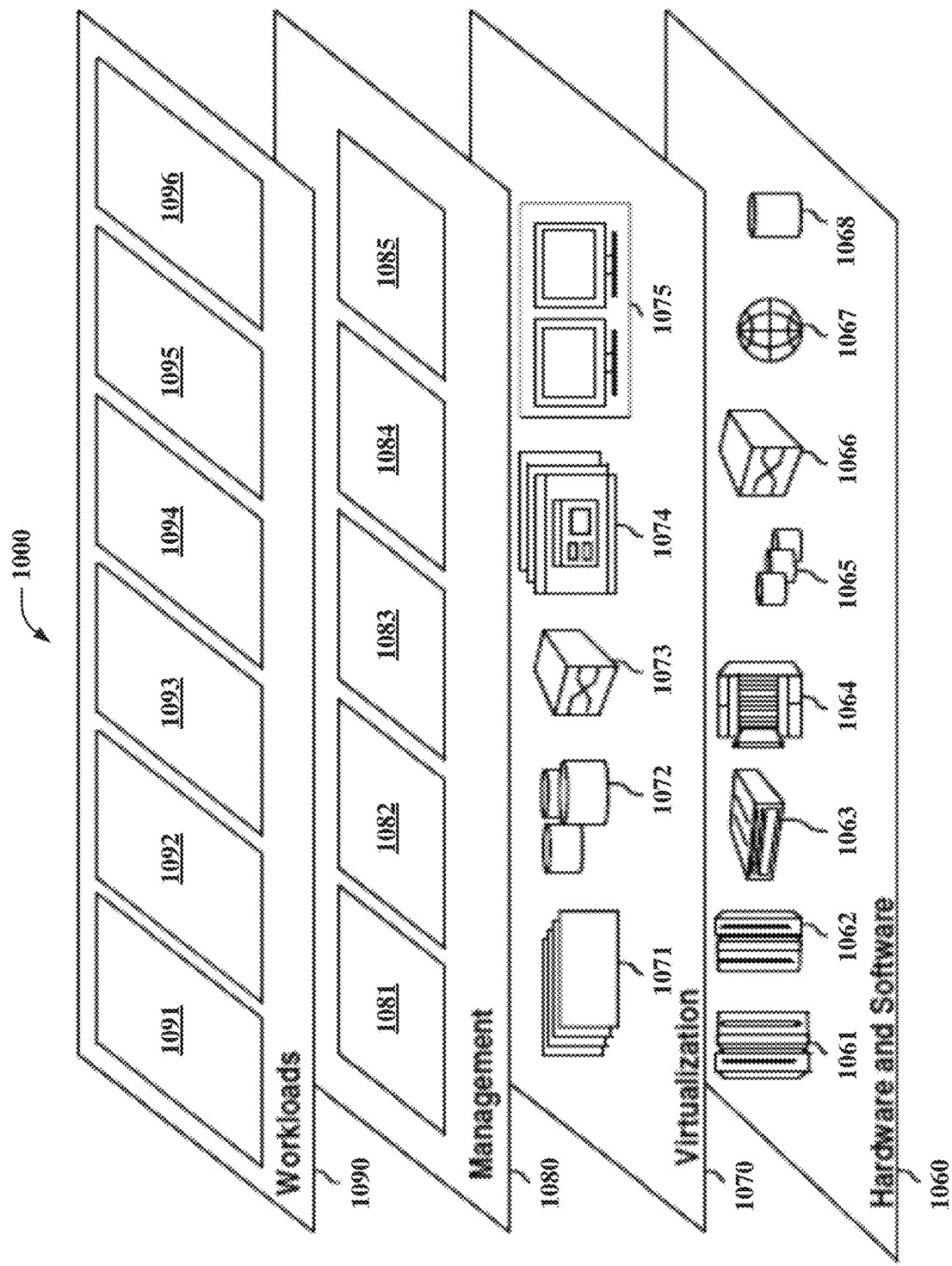
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, database software 1068, quantum platform routing software (not illustrated in FIG. 10), and/or quantum software (not illustrated in FIG. 10).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and model selection visualization software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
   an interaction backend handler component that obtains one or more assessment metrics of a first model pipeline candidate and second model pipeline candidate, wherein the one or more assessment metrics comprises a percentage of training data allocated to a pipeline candidate by an automated pipeline selection process;

a visualization render component that concurrently renders a progress visualization of the first model pipeline candidate and a second progress visualization of the second model pipeline candidate based on the one or more assessment metrics, and wherein the progress visualization comprises a rendering in dots inside of other dots to indicate evaluation or training is in progress, a first type of line to indicate selected model pipeline candidates and a second type of line to indicate discarded model pipeline candidates; and wherein the one or more assessment metrics is a build time metric, and wherein the first model pipeline candidate comprises a first combination of a machine learning model, a transformer and an estimator and wherein the second model pipeline candidate comprises a second combination of a machine learning model, a transformer and an estimator.

2. The system of claim 1, wherein the visualization render component further renders the progress visualization in at least one of a progress map, a relationship map, or a leaderboard.

3. The system of claim 1, wherein the progress visualization comprises a visual representation of the one or more assessment metrics.

4. The system of claim 1, wherein the progress visualization comprises an interactive progress visualization, and wherein the visualization render component renders a tooltip visualization comprising at least one of a textual representation or a numerical representation of the one or more assessment metrics based on selection of the interactive progress visualization.

5. The system of claim 1, wherein the visualization render component renders a ranking of the first model pipeline candidate and the second model pipeline candidate based on assessment metrics of the first model pipeline candidate and the second model pipeline candidate.

6. The system of claim 1, wherein the computer executable components further comprise:

an action component that performs at least one of a stop operation, a save operation, or a discard operation individually corresponding to the first model pipeline candidate or the second model pipeline candidate based on a determination that a defined maximum build time has been met with respect to the first model pipeline candidate or the second model pipeline candidate that is being evaluated, thereby facilitating at least one of improved selection of a model in a model selection process, improved performance of the processor in executing the model selection process, or reduced computational costs of the processor in executing the model selection process.

7. A computer-implemented method, comprising:

obtaining, by a system operatively coupled to a processor, one or more assessment metrics of a plurality of model pipeline candidates wherein the one or more assessment metrics comprises a percentage of training data allocated to a pipeline candidate by an automated pipeline selection process;

rendering, by the system, a progress visualization of the plurality of model pipeline candidates based on the one or more assessment metrics, wherein the progress visualization comprises rendering as solid black dots to indicate that various operations have been completed and rendering in dots inside of other dots to indicate evaluation or training is in progress, a first type of line to indicate selected model pipeline candidates and a second type of line to indicate discarded model pipeline candidates; and wherein the one or more assessment metrics is a build time metric, and wherein a first model pipeline candidate comprises a first combination of a machine learning model, a transformer and an estimator and wherein a second model pipeline candidate comprises a second combination of a machine learning model, a transformer and an estimator.

8. The computer-implemented method of claim 7, wherein the one or more assessment metrics are selected from a group consisting of an optimization metric, a performance metric, a data allocation metric, a training data used metric, and a build time metric.

9. The computer-implemented method of claim 7, further comprising:

rendering, by the system, the progress visualization is also at least one of a progress map, a tree based visualization, a relationship map, or a leaderboard.

10. The computer-implemented method of claim 7, wherein the progress visualization comprises a visual representation of the one or more assessment metrics.

11. The computer-implemented method of claim 7, wherein the progress visualization comprises an interactive progress visualization, and further comprising:

rendering, by the system, a tooltip visualization comprising at least one of a textual representation or a numerical representation of the one or more assessment metrics based on selection of the interactive progress visualization.

12. The computer-implemented method of claim 7, further comprising:

rendering, by the system, a ranking of the plurality of model pipeline candidates based on assessment metrics of the plurality of model pipeline candidates.

13. The computer-implemented method of claim 7, further comprising:

performing, by the system, at least one of a stop operation, a save operation, or a discard operation corresponding to only one of the plurality of model pipeline candidates based on input from an entity, thereby facilitating at least one of improved selection of a model in a model selection process, improved performance of the processor in executing the model selection process, or reduced computational costs of the processor in executing the model selection process.

14. A computer program product facilitating a visualized model selection process, the computer program product comprising a computer readable storage medium having program instructions embodied therewith, the program instructions executable by a processor to cause the processor to:

obtain, by the processor, one or more assessment metrics of a first model pipeline candidate and a second model pipeline candidate wherein the one or more assessment metrics comprises a percentage of training data allocated to a pipeline candidate by an automated pipeline selection process;

render, by the processor, a progress visualization of the first model pipeline candidate and a progress visualization of the second model pipeline candidate based on the one or more assessment metrics, wherein the progress visualization comprises rendering in dots inside of other dots to indicate evaluation or training is in progress, a first type of line to indicate selected model pipeline candidates and a second type of line to indicate discarded model pipeline candidates; and wherein the one or more assessment metrics is a build time metric, and wherein the first model pipeline candidate comprises a first combination of a machine learning model, a transformer and an estimator and wherein the second model pipeline candidate comprises a second combination of a machine learning model, a transformer and an estimator.

15. The computer program product of claim 14, wherein the one or more assessment metrics are selected from a group consisting of an optimization metric, a performance metric, a data allocation metric, a training data used metric, and a build time metric, and wherein the progress visualization comprises a visual representation of the one or more assessment metrics.

16. The computer program product of claim 14, wherein the program instructions are further executable by the processor to cause the processor to:

render, by the processor, the progress visualization in at least one of a progress map, a tree based visualization, a relationship map, or a leaderboard.

17. The computer program product of claim 14, wherein the progress visualization comprises an interactive progress visualization, and wherein the program instructions are further executable by the processor to cause the processor to:

render, by the processor, a tooltip visualization comprising at least one of a textual representation or a numerical representation of the one or more assessment metrics based on selection of the interactive progress visualization.

18. The computer program product of claim 14, wherein the program instructions are further executable by the processor to cause the processor to: render, by the processor, a ranking of the first model pipeline candidate and the second model pipeline candidate based on assessment metrics of the first model pipeline candidate and the second pipeline candidate.

19. The computer program product of claim 14, wherein the program instructions are further executable by the processor to cause the processor to: perform, by the processor, at least one of a stop operation, a save operation, or a discard operation corresponding to the first model pipeline candidate and the second model pipeline candidate based on input from an entity, thereby facilitating at least one of improved selection of a model in a model selection process, improved performance of the processor in executing the model selection process, or reduced computational costs of the processor in executing the model selection process.

* * * * *